(12) United States Patent
Tsukamoto

(10) Patent No.: US 11,873,165 B2
(45) Date of Patent: Jan. 16, 2024

(54) ARTICLE TRANSPORT APPARATUS

(71) Applicant: Daifuku Co., Ltd., Osaka (JP)

(72) Inventor: Kunihiro Tsukamoto, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 420 days.

(21) Appl. No.: 17/160,935

(22) Filed: Jan. 28, 2021

(65) Prior Publication Data

US 2021/0237976 A1 Aug. 5, 2021

(30) Foreign Application Priority Data

Jan. 31, 2020 (JP) ................................ 2020-015527

(51) Int. Cl.
*B65G 1/137* (2006.01)
(52) U.S. Cl.
CPC ................................ *B65G 1/1375* (2013.01)
(58) Field of Classification Search
CPC .................................................... B65G 1/1375
See application file for complete search history.

(56) References Cited

U.S. PATENT DOCUMENTS

| | | | | |
|---|---|---|---|---|
| 5,839,872 A * | 11/1998 | Goto | ................... | B65G 1/0435 414/280 |
| 6,321,147 B1 * | 11/2001 | Takeda | ................. | G05D 1/0038 701/448 |
| 7,920,962 B2 * | 4/2011 | D'Andrea | ............ | G05D 1/0212 701/410 |
| 2006/0229803 A1 * | 10/2006 | Shimamura | .......... | G05D 1/0261 701/532 |
| 2007/0294029 A1 * | 12/2007 | D'Andrea | ............ | G01C 21/005 701/410 |
| 2008/0009964 A1 * | 1/2008 | Bruemmer | ............. | G06N 3/008 700/245 |
| 2008/0051985 A1 * | 2/2008 | D'Andrea | ............ | G05D 1/0291 701/410 |
| 2012/0083964 A1 * | 4/2012 | Montemerlo | ............. | B60T 8/17 701/25 |
| 2013/0238117 A1 * | 9/2013 | Yagawa | ........... | G05B 19/41895 700/228 |

(Continued)

FOREIGN PATENT DOCUMENTS

| | | |
|---|---|---|
| JP | 2003206004 A | 7/2003 |
| JP | 2009107732 A | 5/2009 |
| JP | 201660624 A | 4/2016 |

*Primary Examiner* — Kyle O Logan
(74) *Attorney, Agent, or Firm* — The Webb Law Firm

(57) ABSTRACT

A movement apparatus is provided that moves an article in a transfer direction. The movement apparatus is provided with a first protruding/retracting unit, a second protruding/retracting unit installed in a state spaced apart from the first protruding/retracting unit in the width direction, a first drive unit that moves the first protruding/retracting unit in the width direction, and a second drive unit that moves the second protruding/retracting unit in the width direction. The first drive unit is configured to move the first protruding/retracting unit in the width direction within a first setting range by swinging a first connection unit, and the second drive unit is configured to move the second protruding/retracting unit in the width direction within a second setting range wider than the first setting range by moving a second connection unit back and forth in a prescribed path.

15 Claims, 16 Drawing Sheets

(56) References Cited

U.S. PATENT DOCUMENTS

| | | | | |
|---|---|---|---|---|
| 2014/0358338 A1* | 12/2014 | Harasaki | ............... | B61L 23/042 |
| | | | | 701/19 |
| 2016/0174453 A1* | 6/2016 | Matsuzaki | ........... | G05D 1/0295 |
| | | | | 701/2 |
| 2016/0347551 A1* | 12/2016 | Nishikawa | ............. | B65G 43/00 |
| 2017/0341862 A1* | 11/2017 | Aschauer | ............. | B65G 1/0435 |
| 2021/0237976 A1* | 8/2021 | Tsukamoto | .......... | B65G 1/1375 |

\* cited by examiner

ARTICLE TRANSPORT APPARATUS

CROSS-REFERENCE TO RELATED APPLICATION

This application claims priority to Japanese Patent Application No. 2020-015527 filed Jan. 31, 2020, the disclosure of which is hereby incorporated by reference in its entirety.

BACKGROUND OF THE INVENTION

1. Field of the Invention

The present invention relates to an article transport apparatus provided with a transfer apparatus that moves an article in a transfer direction, and a movement apparatus that moves the transfer apparatus along a transport path.

2. Description of the Related Art

As such an article transport facility, for example, the article transport facility described in JP 2016-060624A is known. Hereinafter, in the description of related art, reference signs or names in parentheses are the reference signs or names in the related art document. This article transport apparatus is provided with a transfer apparatus that moves an article in a transfer direction, and a movement apparatus that moves the transfer apparatus in the vertical direction and the width direction (a first direction (X)). The transfer apparatus is provided with a first protruding/retracting unit (a fixed slide apparatus (15b)) and a second protruding/retracting unit (a moving slide apparatus (15a)) capable of protruding/retracting in the transfer direction, and a drive unit (configured with a spacing motor (23), a rotating belt (28), and the like) that moves the second protruding/retracting unit in the width direction. An article between the first protruding/retracting unit and the second protruding/retracting unit is transferred to a transfer target location by causing the first protruding/retracting unit and the second protruding/retracting unit to protrude toward the transfer target location in a state in which the spacing between the first protruding/retracting unit and the second protruding/retracting unit in the width direction is set to a spacing that corresponds to the size of the article in the width direction. After the article has been transferred in this way, the drive unit moves the second protruding/retracting unit in the width direction to increase the spacing between the first protruding/retracting unit and the second protruding/retracting unit, and then withdraws the first protruding/retracting unit and the second protruding/retracting unit toward the transfer apparatus.

SUMMARY OF THE INVENTION

In the above article transport apparatus, when withdrawing the first protruding/retracting unit and the second protruding/retracting unit toward the transfer apparatus, in some cases the article may be in contact with the first protruding/retracting unit or the second protruding/retracting unit. In particular, when the transfer apparatus is moved in the width direction by the movement apparatus, due to acceleration or deceleration of that movement the article may move in the width direction on the transfer apparatus, and thus the article may be in contact with the first protruding/retracting unit and the second protruding/retracting unit. Even in a case where the article is in contact with the first protruding/retracting unit and the second protruding/retracting unit, although the second protruding/retracting unit is moved in the width direction by the drive unit and thus separates from the article, the first protruding/retracting unit is not moved in the width direction and thus remains in contact with the article. In this sort of state, if the first protruding/retracting unit and the second protruding/retracting unit are withdrawn toward the transfer apparatus, the article in contact with the first protruding/retracting unit may move together with the first protruding/retracting unit, so there is a possibility that the article will become offset from the correct position at the transfer target location. On the other hand, if a configuration is adopted in which the first protruding/retracting unit and the second protruding/retracting unit are moved by the same amount in the width direction, it is necessary to provide space for movement of these protruding/retracting units in the width direction on both sides of the article at the transfer target location, so the accommodation efficiency of the article at the transfer target location may decrease.

Therefore, it is desired to realize an article transport apparatus that can suppress a decrease in accommodation efficiency of the article at the transfer target location while having a configuration such that it is possible to prevent movement of the article when withdrawing the first protruding/retracting unit.

In consideration of the above matters, an article transport apparatus is provided with a transfer apparatus that moves an article in a transfer direction, and a movement apparatus that moves the transfer apparatus along a transport path, a direction orthogonal to the transfer direction when viewed in a vertical direction being defined as a width direction, the transfer apparatus being provided with a first protruding/retracting unit capable of protruding/retracting in the transfer direction, and a second protruding/retracting unit capable of protruding/retracting in the transfer direction and installed in a state spaced apart from the first protruding/retracting unit in the width direction;

the transfer apparatus further including a first drive unit that moves the first protruding/retracting unit in the width direction, and a second drive unit that moves the second protruding/retracting unit in the width direction; the first drive unit being provided with a first connection unit connected to the first protruding/retracting unit, a swing mechanism that swings the first connection unit around a prescribed axis, and a first drive mechanism that drives the swing mechanism, the first drive unit being configured to move the first protruding/retracting unit in the width direction within a first setting range by swinging the first connection unit; and the second drive unit being provided with a second connection unit connected to the second protruding/retracting unit, a reciprocating movement mechanism that moves the second connection unit in a reciprocating manner along a prescribed path in the width direction, and a second drive mechanism that drives the reciprocating movement mechanism, the second drive unit being configured to move the second protruding/retracting unit in the width direction within a second setting range wider than the first setting range by moving the second connection unit back and forth in the prescribed path.

According to this configuration, the second drive unit that moves the second protruding/retracting unit in the width direction is provided, so by moving the second protruding/retracting unit in the width direction with the second drive unit, it is possible to set the spacing between the first protruding/retracting unit and the second protruding/retracting unit in the width direction to a spacing that corresponds to the size of the article in the width direction. Also, by causing the first protruding/retracting unit and the second protruding/retracting unit to protrude toward the transfer target location in a state in which the first protruding/retracting unit and the second protruding/retracting unit have this sort of spacing, it is possible to transfer the article between the first protruding/retracting unit and the second protruding/retracting unit to the transfer target location. Also, after transferring the article to the transfer target location, after moving the second protruding/retracting unit in the width direction with the second drive unit and moving the first protruding/retracting unit in the width direction with the first drive unit to increase the spacing between the first protruding/retracting unit and the second protruding/retracting unit, by causing the first protruding/retracting unit and the second protruding/retracting unit to withdraw toward the transfer apparatus, it is possible to move both the first protruding/retracting unit and the second protruding/retracting unit away from the article, and therefore it is possible to avoid movement of the article due to the article contacting the first protruding/retracting unit when withdrawing the first protruding/retracting unit.

Also, the first setting range in which the first protruding/retracting unit is moved in the width direction by the first drive unit is smaller than the second setting range in which the second protruding/retracting unit is moved in the width direction by the second drive unit. Therefore, the space that needs to be left open for movement of the first protruding/retracting unit in the width direction on the first protruding/retracting unit side with respect to the article at the transfer target location can be kept to a small space. Further, the second drive unit has a configuration in which the second protruding/retracting unit is moved by moving the second connection unit back and forth along a prescribed path, whereas the first drive unit has a configuration in which the first protruding/retracting unit is moved by swinging the first connection unit around a prescribed axis, so the configuration of the first drive unit can easily be made compact. Therefore, according to this configuration, while it is possible to avoid movement of the article when withdrawing the first protruding/retracting unit, it is also possible to adopt a compact configuration for the first drive unit, and possible to suppress a decrease in accommodation efficiency of the article at the transfer target location.

DETAILED DESCRIPTION OF PREFERRED EMBODIMENTS

1. Embodiment

An embodiment of an article transport facility provided with an article transport apparatus will be described with reference to the drawings.

Figure 1:
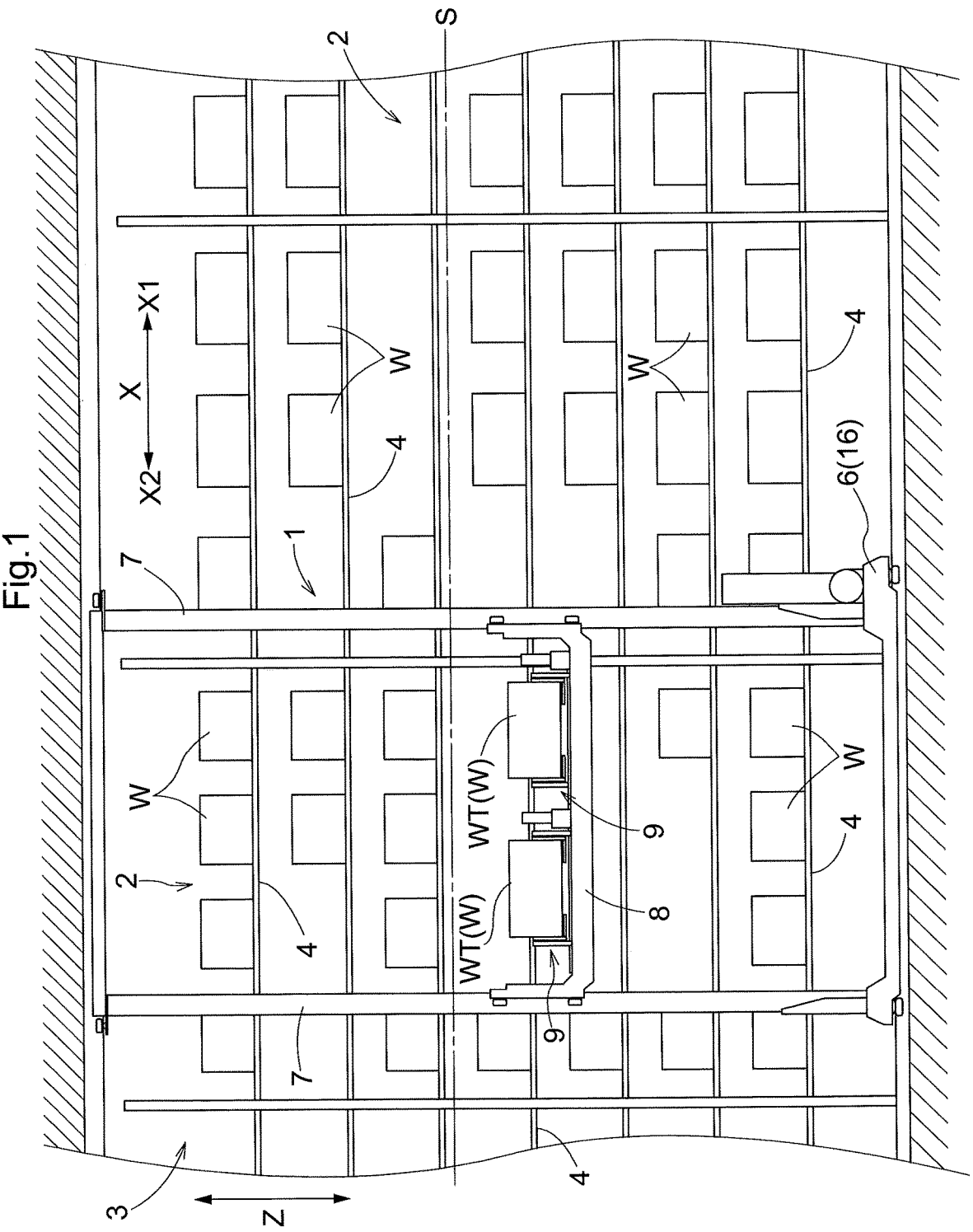
FIG. 1 is a side view of an article transport facility.
Figure 2:
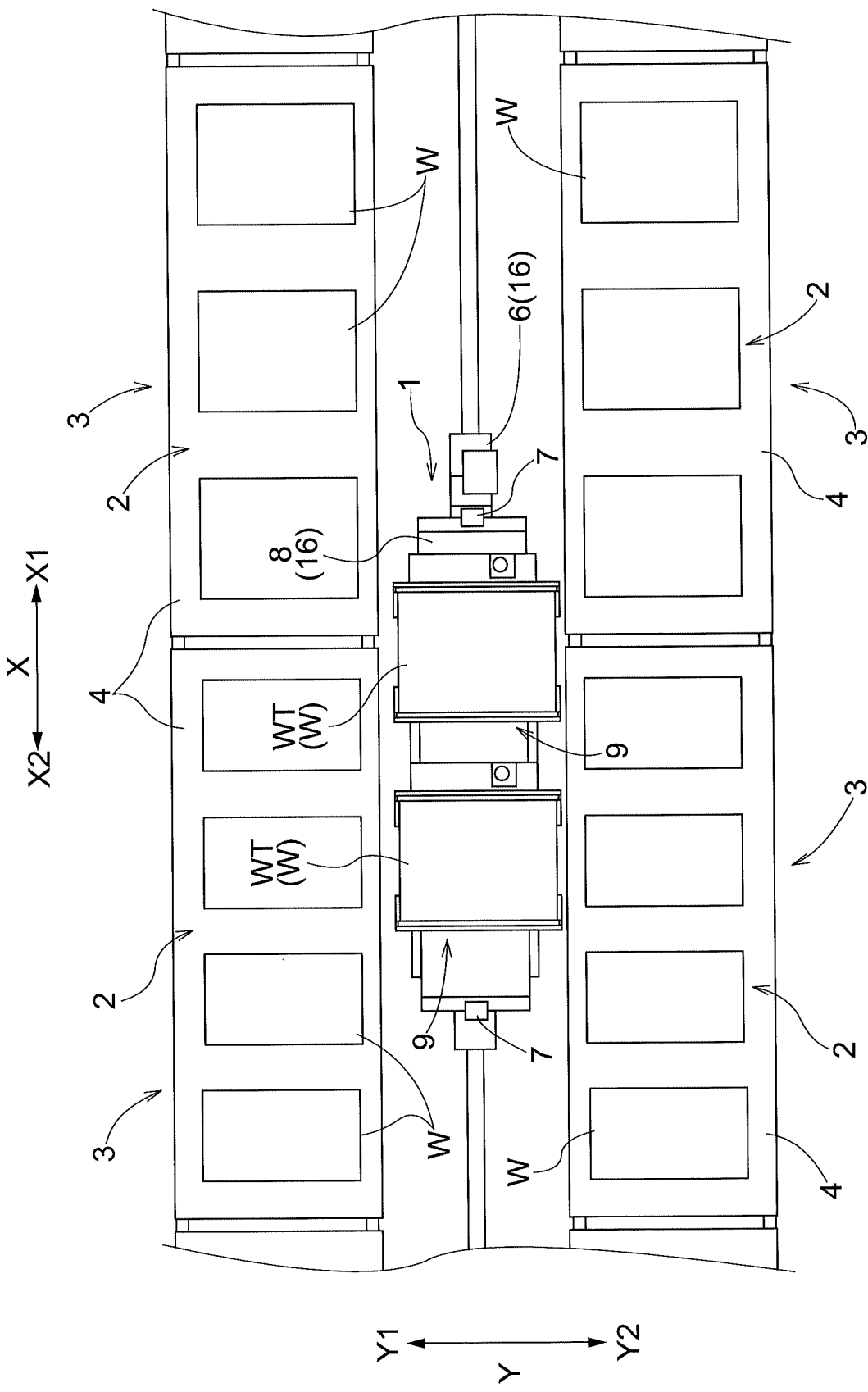
FIG. 2 is a plan view of the article transport facility.

As shown in FIGS. 1 and 2, the article transport facility includes an article transport apparatus 1 that travels in a first direction X to transport articles W, and article storage shelves 3 provided with a plurality of storage units 2. Hereinafter, one side in the first direction X is referred to as a first direction first side X1, and the opposite side thereto is referred to as a first direction second side X2. Further, a direction orthogonal to the first direction X when viewed in the vertical direction in a vertical direction Z is referred to as a second direction Y, one side in the second direction Y is referred to as a second direction first side Y1, and the opposite side thereto is referred to as a second direction second side Y2. The first direction X corresponds to a width direction, and the second direction Y corresponds to a transfer direction. Further, the first direction first side X1 corresponds to a width direction first side, and the first direction second side X2 corresponds to a width direction second side. The first direction X is also the travel direction of the article transport apparatus 1. The second direction Y is also the depth direction of the article storage shelves 3.

A pair of the article storage shelves 3 are installed so as to face each other sandwiching a travel path on which the article transport apparatus 1 travels. Shelf boards 4 are installed in each of the pair of article storage shelves 3 in a state lined up in the vertical direction Z, and the storage units 2 are formed on the shelf boards 4. A plurality of types of articles W with different sizes in the first direction X are stored on the article storage shelves 3, and a plurality of types of articles W with different sizes in the first direction X are included among the articles W transported by the article transport apparatus 1.

Figure 7:
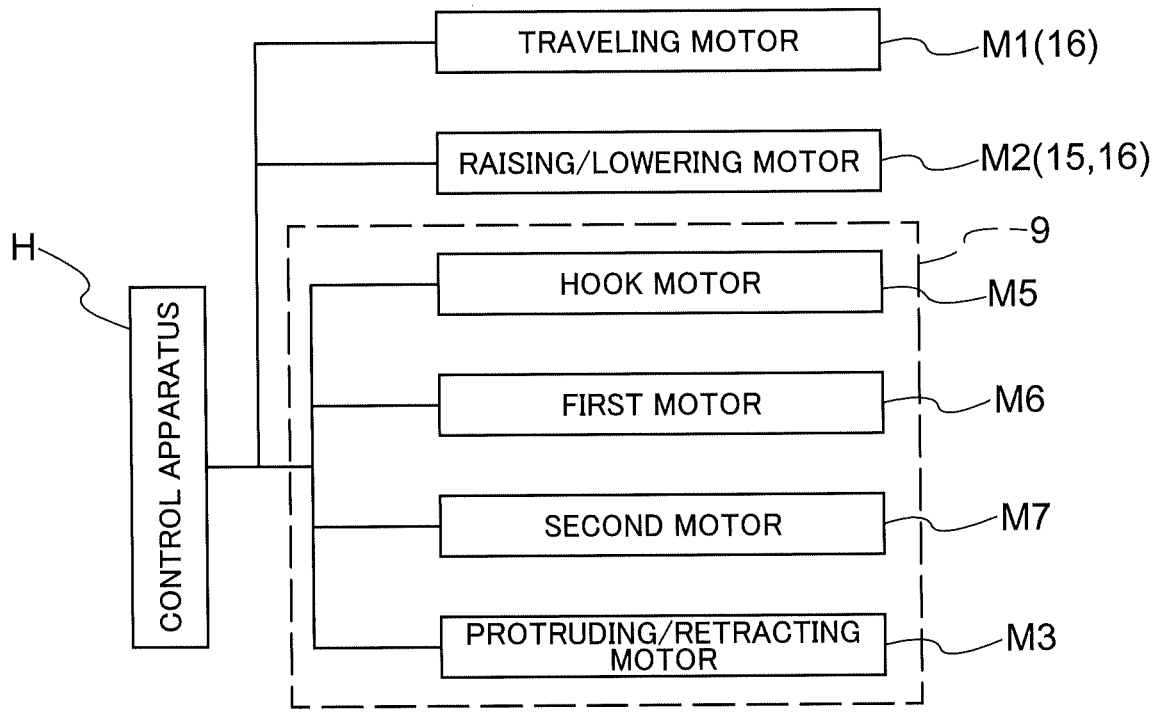
FIG. 7 is a control block diagram.

As shown in FIG. 1, the article transport apparatus 1 includes a traveling body 6 that travels in the first direction X, a raising/lowering body 8 that raises/lowers in the vertical direction Z along support columns 7 erected on the traveling body 6, and transfer apparatuses 9 that transfer the articles W in the second direction Y. The transfer apparatuses 9 are supported by the raising/lowering body 8. In the present embodiment, two of the transfer apparatuses 9 are supported by the raising/lowering body 8 in a state lined up in the first direction X. Further, as shown in FIG. 7, the article transport apparatus 1 includes a traveling motor M1 that allows the traveling body 6 to travel in the first direction X and a raising/lowering motor M2 that raises/lowers the raising/lowering body 8 in the vertical direction Z. Note that in the present embodiment, the article transport apparatus 1 is a stacker crane.

When the traveling body 6 travels in the first direction X, the raising/lowering body 8 supported by the traveling body 6 and the two transfer apparatuses 9 supported by the raising/lowering body 8 move in the first direction X. By the raising/lowering body 8 raising/lowering in the vertical direction Z, the two transfer apparatuses 9 supported by the raising/lowering body 8 move in the vertical direction Z. Note that the raising/lowering body 8 corresponds to a support body that supports the transfer apparatuses 9, and includes the raising/lowering motor M2 or the like to form a raising/lowering mechanism 15 that moves the support body in the vertical direction Z. Further, the traveling motor M1 is provided in the traveling body 6. A movement apparatus 16 that moves the transfer apparatuses 9 along a transport path includes the traveling body 6, the raising/lowering body 8, and the raising/lowering mechanism 15.

Figure 3:
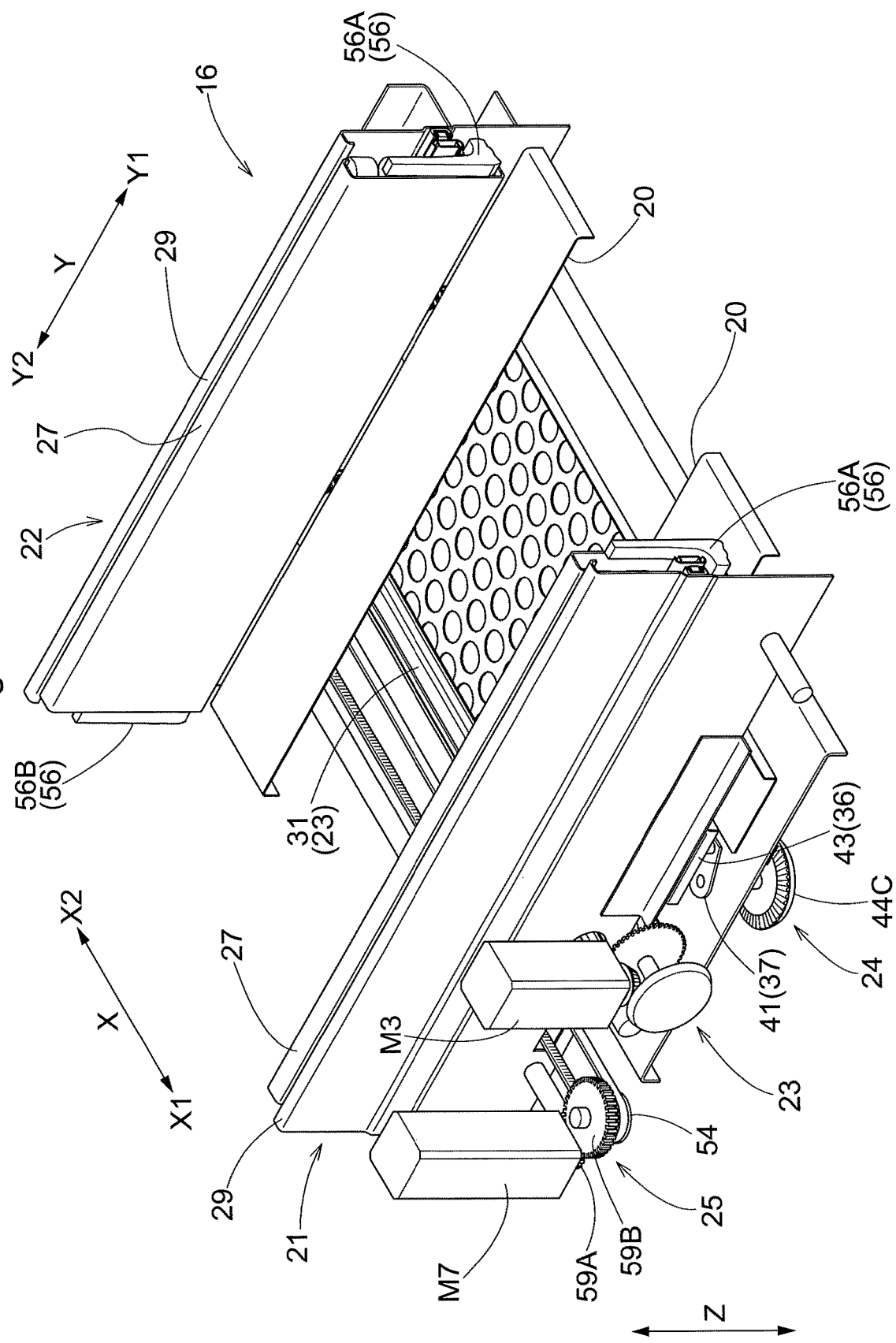
FIG. 3 is a perspective view of a transfer apparatus in a withdrawn state.
Figure 4:
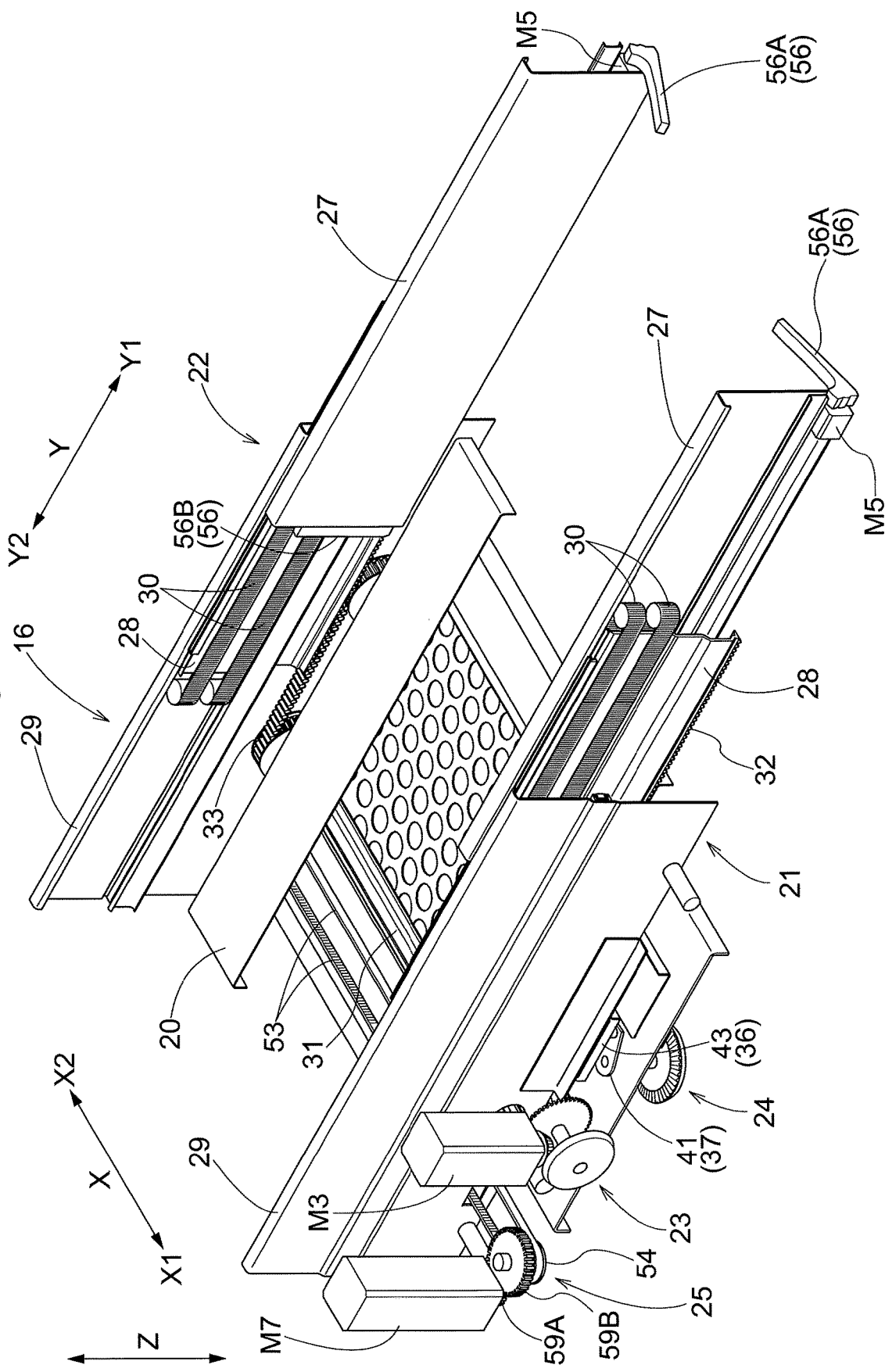
FIG. 4 is a perspective view of the transfer apparatus in a protruding state.

Next, the transfer apparatuses 9 will be described. Since the two transfer apparatuses 9 supported by the raising/lowering body 8 have the same configuration, only one transfer apparatus 9 will be described. As shown in FIGS. 3 and 4, the transfer apparatus 9 has a support base 20 that supports an article W from below, a first protruding/retracting unit 21 that is capable of protruding/retracting in the second direction Y, and a second protruding/retracting unit 22 that is capable of protruding/retracting in the second direction Y and is installed spaced apart from the first protruding/retracting unit 21 in the first direction X.

As shown in FIG. 4, each of the first protruding/retracting unit 21 and the second protruding/retracting unit 22 includes a tip member 27, a relay member 28 that supports the tip member 27 to be capable of sliding in the second direction Y, a base member 29 that supports the relay member 28 to be capable of sliding in the second direction Y, and an interlocking member 30 that interlocks the relay member 28 and the tip member 27. In the first protruding/retracting unit 21, the relay member 28 is positioned on the first direction second side X2 with respect to the base member 29, and the tip member 27 is positioned on the first direction second side X2 with respect to the relay member 28. In the second protruding/retracting unit 22, the relay member 28 is positioned on the first direction first side X1 with respect to the base member 29, and the tip member 27 is positioned on the first direction first side X1 with respect to the relay member 28. When the relay member 28 protrudes/retracts with respect to the base member 29 in the second direction Y, the interlocking member 30 interlocks the relay member 28 and the tip member 27 so as to cause the tip member 27 to protrude/retract with respect to the relay member 28 to the same side that the relay member 28 protruded/retracted.

As shown in FIG. 4, each end of the tip member 27 in the second direction Y has a hook 56 that swings around an axis in the second direction Y, and a hook motor M5 that causes the hook 56 to swing. The hook motor M5 has an engaging attitude in which the hook 56 is tilted to follow the first direction X (see a first hook 56A in FIG. 4) and an evacuating attitude in which the hook 56 is erected to follow the vertical direction Z (see the hook 56 in FIG. 3 and a second hook 56B in FIG. 4). Hereinafter, the hook 56 provided at the end of the tip member 27 on the second direction first side Y1 is referred to as the first hook 56A, and the hook 56 provided at the end of the tip member 27 on the second direction second side Y2 is referred to as the second hook 56B.

As shown in FIGS. 3 and 4, the transfer apparatus 9 is further provided with a protruding/retracting drive unit 23 that moves the first protruding/retracting unit 21 and the second protruding/retracting unit 22 together in the second direction Y, a first drive unit 24 that moves the first protruding/retracting unit 21 in the first direction X, and a second drive unit 25 that moves the second protruding/retracting unit 22 in the first direction X.

The protruding/retracting drive unit 23 changes the state of the first protruding/retracting unit 21 and the second protruding/retracting unit 22 between a withdrawn state in which each of the first protruding/retracting unit 21 and the second protruding/retracting unit 22 are withdrawn on the raising/lowering body 8 (see FIGS. 2 and 3), and a protruding state in which each of the first protruding/retracting unit 21 and the second protruding/retracting unit 22 are caused to protrude in the second direction Y with respect to the raising/lowering body 8 (see FIG. 4). The protruding state includes a protruding state in which each of the first protruding/retracting unit 21 and the second protruding/retracting unit 22 are caused to protrude to the second direction first side Y1 (see FIG. 4), and a protruding state in which each of the first protruding/retracting unit 21 and the second protruding/retracting unit 22 are caused to protrude to the second direction second side Y2 (not shown).

As shown in FIG. 4, the protruding/retracting drive unit 23 includes a protruding/retracting drive shaft 31, a protruding/retracting motor M3 that rotationally drives the protruding/retracting drive shaft 31, and a belt 33 that engages with a rack 32 provided at the lower end of the relay member 28. The belt 33 is provided corresponding to each of the first protruding/retracting unit 21 and the second protruding/retracting unit 22. The protruding/retracting drive unit 23 rotationally drives the protruding/retracting drive shaft 31 with the protruding/retracting motor M3, and rotates the belt 33 in the longitudinal direction thereof. As a result, the relay member 28 of the first protruding/retracting unit 21 and the relay member 28 of the second protruding/retracting unit 22 are moved to the same side in the second direction Y, and the first protruding/retracting unit 21 and the second protruding/retracting unit 22 are protruded/retracted to the same side.

Figure 6:
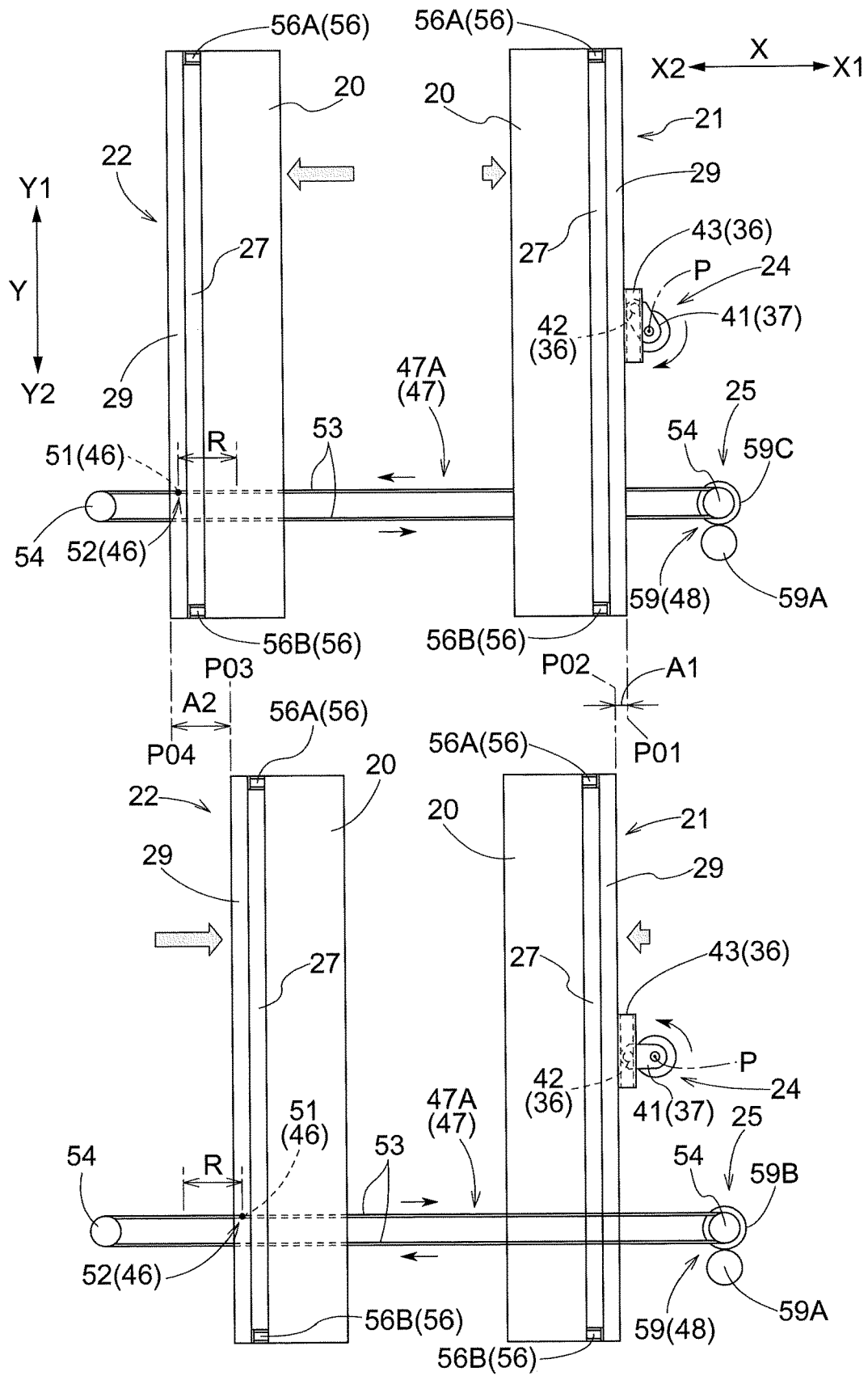
FIG. 6 illustrates operation of a first protruding/retracting unit and a second protruding/retracting unit in a first direction (a width direction).

As shown in FIG. 6, the first drive unit 24 is configured to move the first protruding/retracting unit 21 in the first direction X within a first setting range A1. The first drive unit 24 moves the first protruding/retracting unit 21 in the first direction X, thus moving the first protruding/retracting unit 21 between a first position P01 positioned at the end on the first direction first side X1 in the first setting range A1 (see the upper drawing in FIG. 6), and a second position P02 positioned at the end on the first direction second side X2 in the first setting range A1 (see the lower drawing in FIG. 6).

Figure 5:
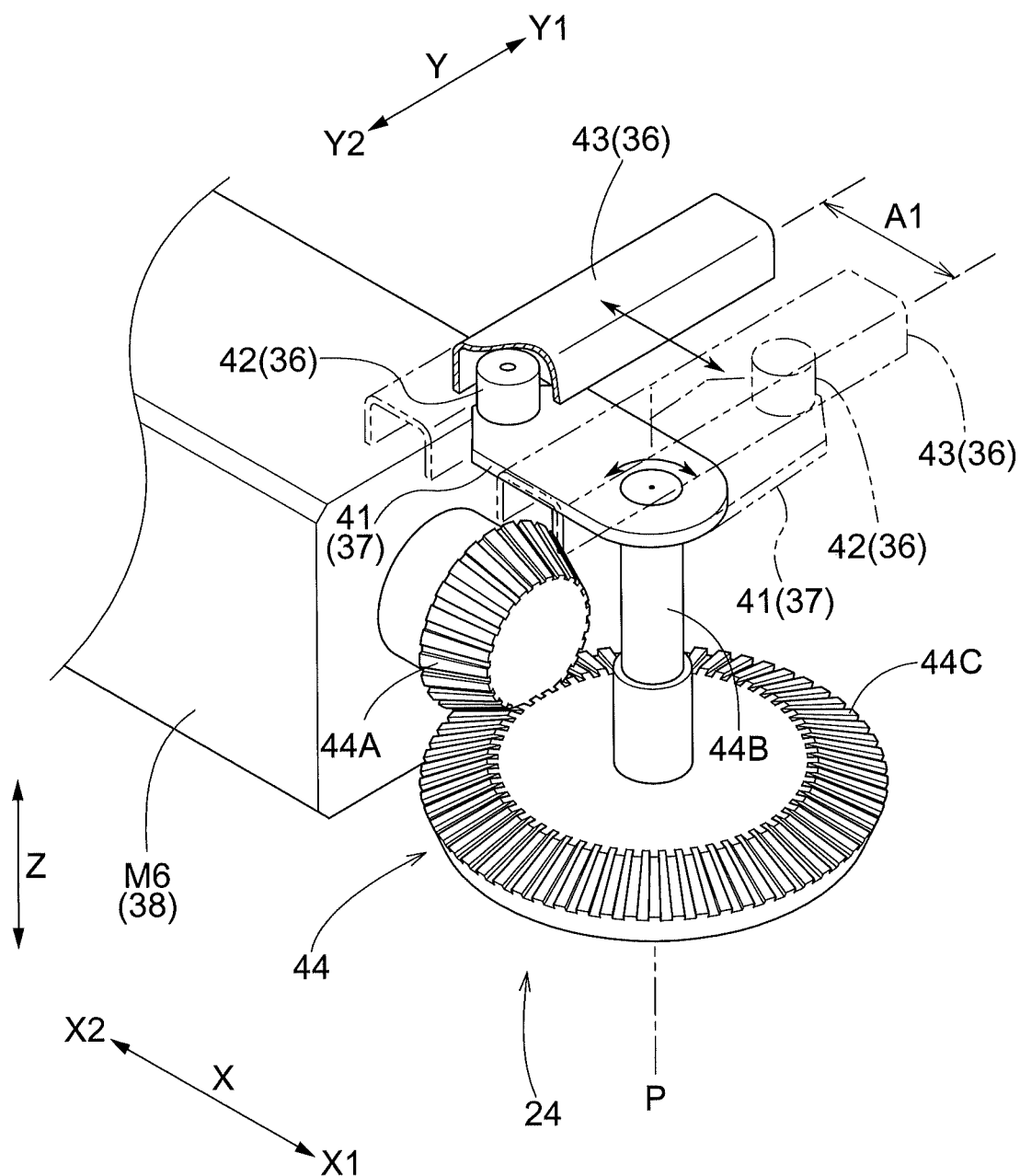
FIG. 5 is a perspective view of a first drive unit

As shown in FIGS. 5 and 6, the first drive unit 24 includes a first connection unit 36 connected to the first protruding/retracting unit 21, a swing mechanism 37 that swings the first connection unit 36 around a prescribed axis P, and a first drive mechanism 38 that drives the swing mechanism 37. The swing mechanism 37 includes a swinging body 41 that is supported so as to be capable of swinging around the prescribed axis P. The first connection unit 36 is provided with a first connection body 42 provided at a position separated from the prescribed axis P of the swinging body 41, and a guide unit 43 that is provided in the first protruding/retracting unit 21 and slidably guides the first connection body 42 in a direction orthogonal to the width direction.

Note that in this example, the guidance direction of the first connection body 42 by the guide unit 43 is the second direction Y.

In the present embodiment, the guide unit 43 is fixed to a base member 29 of the first protruding/retracting unit 21. The guide unit 43 is arranged in a direction (here, the second direction Y) intersecting the width direction, and includes a groove-shaped portion into which the first connection body 42 is inserted. In this example, the guide unit 43 is formed by bending a plate-shaped member so as to form a reverse U shape when viewed in the second direction. Also, the guide unit 43 is arranged in the second direction Y, and forms a groove-shaped portion that is recessed toward the upper side. On the other hand, the first connection body 42 is provided at a position away from the prescribed axis P in the swinging body 41 so as to protrude toward the upper side from the swinging body 41. The first connection body 42 is inserted into the groove of the guide unit 43 from below. In this example, the first connection body 42 is configured with a rotating body that can rotate around an axis in the vertical direction Z.

The first drive mechanism 38 includes a first motor M6, and a first interlocking mechanism 44 that interlocks and connects the first motor M6 to the swinging body 41. As shown in FIG. 5, in the present embodiment, the first interlocking mechanism 44 includes a first bevel gear 44A fixed to an output shaft of the first motor M6, a rotary shaft 44B that rotates around the prescribed axis P together with the swinging body 41, and a second bevel gear 44C that engages with the first bevel gear 44A and is fixed to the rotary shaft 44B. The first drive mechanism 38 swings the swinging body 41 around the prescribed axis P by driving the first motor M6. When the swinging body 41 swings around the prescribed axis P, the first connection body 42 also swings around the prescribed axis P, the guide unit 43 is moved in the first direction X while the first connection body 42 moves relative to the guide unit 43 in the second direction Y, and the first protruding/retracting unit 21 is moved in the first direction X within the first setting range A1. In this way, the first drive unit 24 is configured to move the first protruding/retracting unit 21 in the first direction X within the first setting range A1 by swinging the first connection unit 36.

As shown in FIG. 5 and the lower drawing in FIG. 6, the first drive unit 24 is configured such that, in a state in which the first protruding/retracting unit 21 is positioned at the end on the first direction second side X2 in the first setting range A1, the first connection unit 36 (the first connection body 42) and the prescribed axis P are lined up in the first direction X. Therefore, in such a state, even if a large load acts on the first protruding/retracting unit 21 from the first direction second side X2, it is difficult for the swinging body 41 to swing around the prescribed axis P, so it is easy to hold the position of the first protruding/retracting unit 21.

As shown in FIG. 6, the second drive unit 25 is configured to move the second protruding/retracting unit 22 in the first direction X within a second setting range A2. In the present embodiment, in a case where the spacing between the first protruding/retracting unit 21 and the second protruding/retracting unit 22 in the first direction X is set to correspond to the size of a target article WT that is the article W to be transferred in the first direction X, in a state where the first protruding/retracting unit 21 is set to the second position P02, the second drive unit 25 moves the second protruding/retracting unit 22 within the second setting range A2. That is, in a state in which the spacing between the first protruding/retracting unit 21 and the second protruding/retracting unit 22 in the first direction X is set to correspond to the target article WT in the first direction X, the position of the first protruding/retracting unit 21 is at the same position (the second position P02) even if the size of the target article WT in the first direction X changes, but the position of the second protruding/retracting unit 22 becomes a different position in the first direction X corresponding to the size of the target article WT in the first direction X.

As shown in FIG. 6, the second drive unit 25 includes a second connection unit 46 connected to the second protruding/retracting unit 22, a reciprocating movement mechanism 47 that moves the second connection unit 46 in a reciprocating manner along a prescribed path R in the first direction X, and a second drive mechanism 48 that drives the reciprocating movement mechanism 47. The second drive unit 25 is configured to move the second protruding/retracting unit 22 in the first direction X within the second setting range A2 wider than the first setting range A1 by moving the second connection unit 46 back and forth along the prescribed path R. The second connection unit 46 includes a second connection body 51, and a connection fulcrum 52 provided in the second protruding/retracting unit 22 and connected to the second connection body 51.

In the present embodiment, the reciprocating movement mechanism 47 is a first reciprocating movement mechanism 47A. The first reciprocating movement mechanism 47A includes an endless member 53 that is installed in the first direction X and rotationally driven by the second drive mechanism 48, and the second connection body 51 is attached to a part of the endless member 53.

The first reciprocating movement mechanism 47A includes the endless member 53, which is configured with a toothed belt, and a winding body 54 configured with a pair of toothed pulleys around which the endless member 53 is wound. The second drive mechanism 48 includes a second motor M7, and a second interlocking mechanism 59 that interlocks and connects the second motor M7 to the endless member 53. As shown in FIGS. 3 and 4, in the present embodiment, the second interlocking mechanism 59 includes a first gear 59A fixed to an output shaft of the second motor M7, and a second gear 59B that rotates together with one of a pair of winding bodies 54 and meshes with the first gear 59A. The second drive mechanism 48 rotates the endless member 53 in the longitudinal direction by driving of the second motor M7. As a result, the endless member 53 rotates such that a pair of planar strip portions in the first direction X move in directions opposite to each other. The first reciprocating movement mechanism 47A, by the endless member 53 rotating in this way, moves the connection fulcrum 52 connected to the second connection body 51 of the endless member 53 in the first direction X, and thus moves the second protruding/retracting unit 22 in the first direction X within the second setting range A2. In this way, the first reciprocating movement mechanism 47A is configured to move the second protruding/retracting unit 22 in the first direction X within the second setting range A2 by moving the second connection unit 46 back and forth within the prescribed path R.

Figure 11:
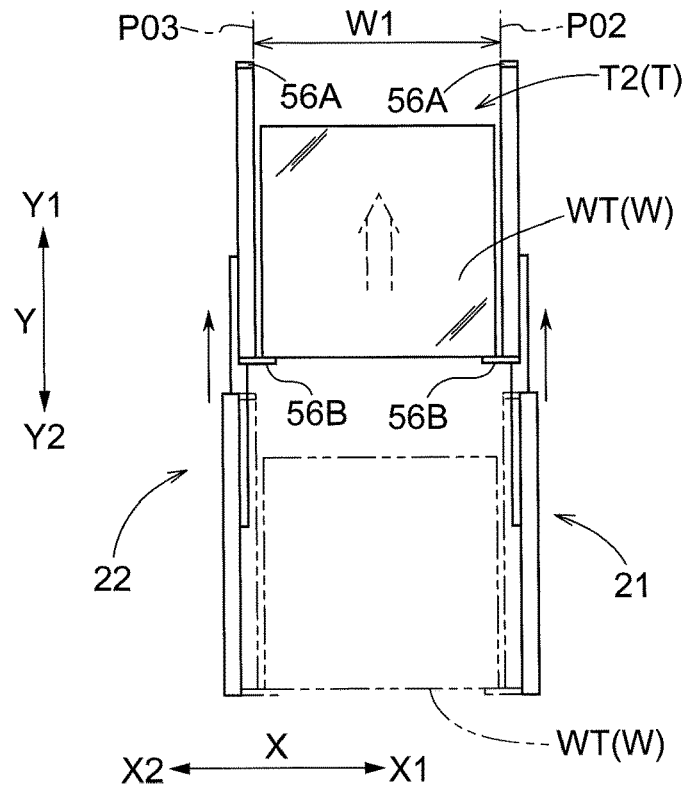
FIG. 11 illustrates operation of a second protrusion control.

As shown in FIGS. 11 to 20, regarding the spacing between the first protruding/retracting unit 21 and the second protruding/retracting unit 22 in the first direction X, a spacing corresponding to the spacing in the first direction X of the target article WT that is the article W to be transferred is referred to as a transfer spacing W1, a spacing wider than the transfer spacing W1 is referred to as a first evacuation spacing W2, and a spacing wider than the first evacuation spacing W2 is referred to as a second evacuation spacing W3. In the present embodiment, as shown in FIG. 11, by setting the first protruding/retracting unit 21 to the second position P02, and setting the second protruding/retracting unit 22 to a position corresponding to the size of the target article WT in the first direction X (referred to as a third position P03), the spacing between the first protruding/retracting unit 21 and the second protruding/retracting unit 22 in the first direction X becomes the transfer spacing W1. This transfer spacing W1 is wider than the size of the target article WT in the first direction X, but is set to a spacing narrower than a size obtained by adding the amount of protrusion from the tip member 27 for one hook 56 in the engaging attitude to the size of the target article WT in the first direction X. Therefore, in a state in which the pair of hooks 56 provided on the same side in the second direction Y are set to the engaging attitude, by protruding/retracting the first protruding/retracting unit 21 and the second protruding/retracting unit 22, the pair of hooks 56 engage with the target article WT and therefore can move the target article WT in the second direction Y.

Figure 12:
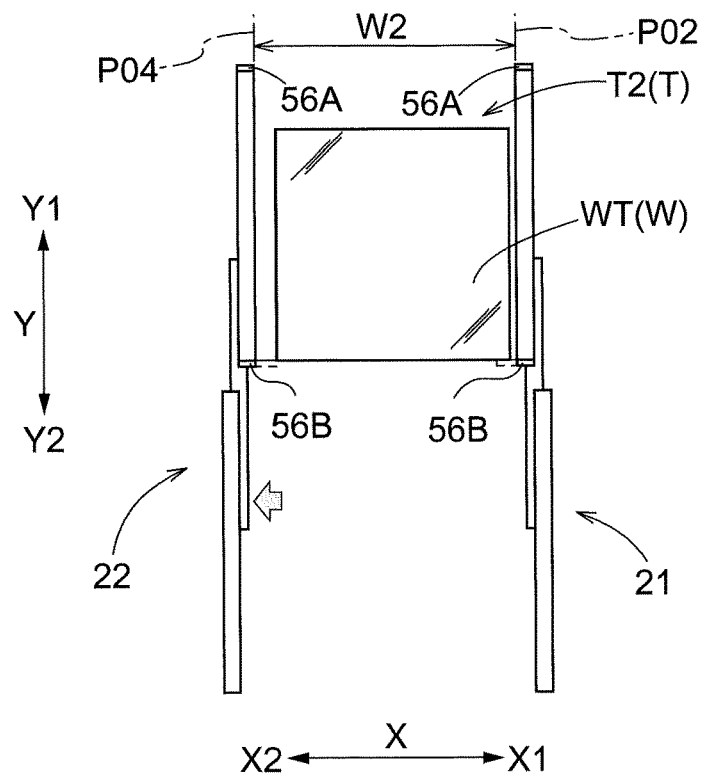
FIG. 12 illustrates operation of a first separation control.
Figure 14:
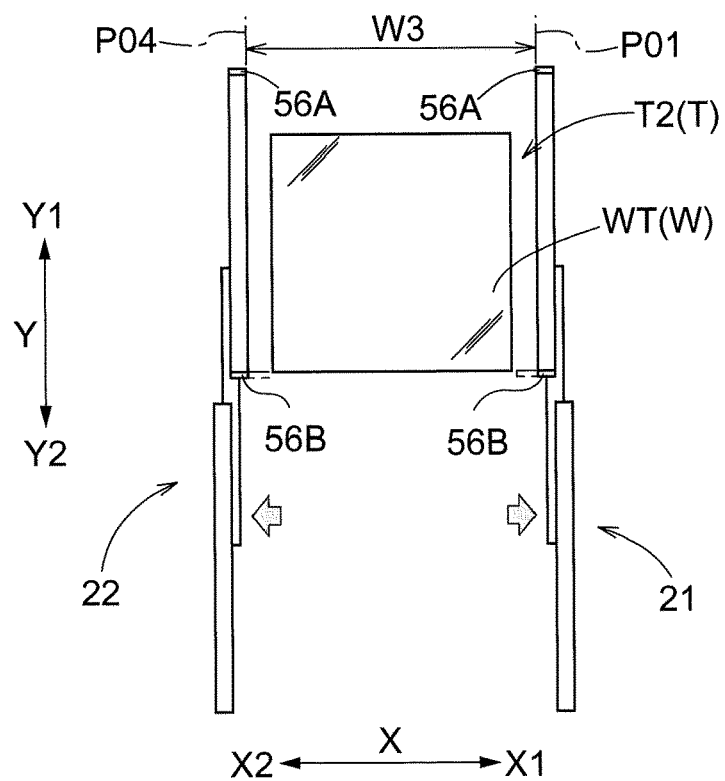
FIG. 14 illustrates operation of a second separation control.

Further, as shown in FIG. 12, by setting the first protruding/retracting unit 21 to the second position P02, and setting the second protruding/retracting unit 22 to a position on the first direction second side X2 that is a set distance away from a third position P03 (hereinafter, referred to as fourth position P04), the spacing between the first protruding/retracting unit 21 and the second protruding/retracting unit 22 in the first direction X becomes the first evacuation spacing W2. Further, as shown in FIG. 14, by setting the first protruding/retracting unit 21 to the first position P01 and setting the second protruding/retracting unit 22 to the fourth position P04, the spacing between the first protruding/retracting unit 21 and the second protruding/retracting unit 22 in the first direction X becomes the second evacuation spacing W3. Note that in the example shown, the set distance, which is the distance between the third position P03 and the fourth position P04, is the same as the distance between the first position P01 and the second position P02.

The article transport apparatus 1 includes a control apparatus H that controls the transfer apparatus 9. In the present embodiment, the control apparatus H controls the traveling body 6 and the raising/lowering mechanism 15 in addition to the transfer apparatus 9. The control apparatus H executes a travel control in which the traveling body 6 and the raising/lowering mechanism 15 are moved so that the transfer apparatus 9 is positioned at a set position corresponding to a transfer target location T, and a transfer control that transfers the target article WT to/from the transfer target location T in a state in which the transfer apparatus 9 is at the set position. The transfer control includes a first transfer control and a second transfer control. The transfer control executed in a first transfer in which the target article WT is transferred from a transfer source location T1 to the transfer apparatus 9 using the transfer target location T as the transfer source location T1 is defined as the first transfer control. The transfer control executed in a second transfer in which the target article WT is transferred from the transfer apparatus 9 to a transfer destination location T2 using the transfer target location T as the transfer destination location T2 is defined as the second transfer control. That is, when transferring the target article WT from the transfer source location T1 to the transfer apparatus 9, the control apparatus H executes the first transfer control, and when transferring the target article WT from the transfer apparatus 9 to the transfer destination location T2, the control apparatus H executes the second transfer control.

Figure 16:
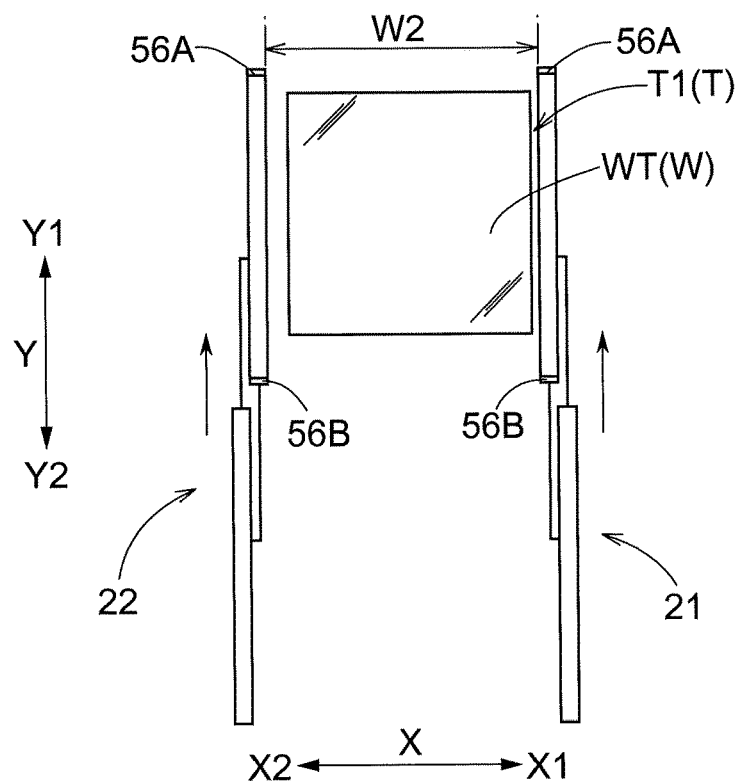
FIG. 16 illustrates operation of a first protrusion control.
Figure 17:
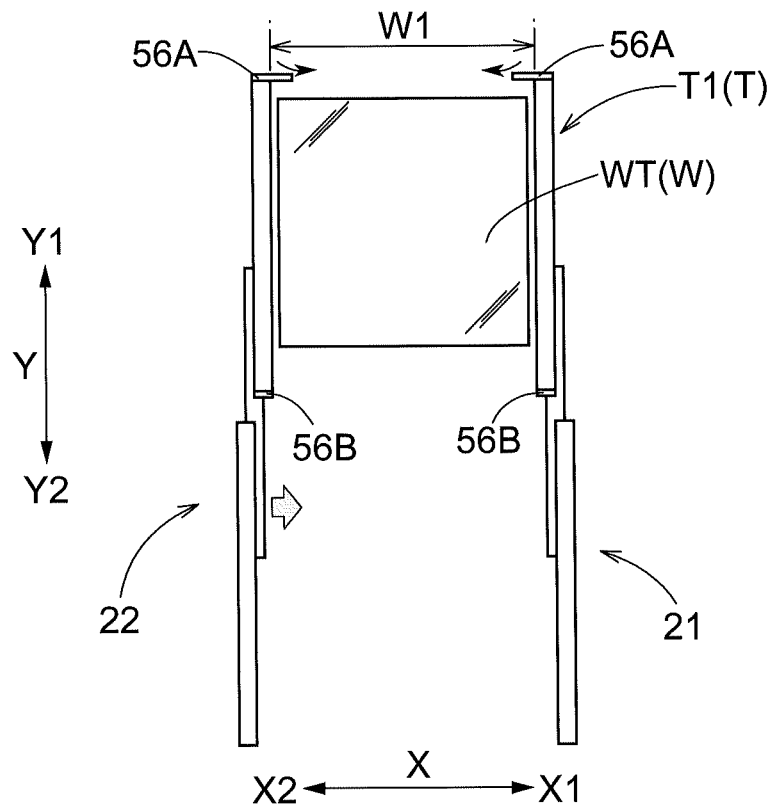
FIG. 17 illustrates operation of an approach control.
Figure 18:
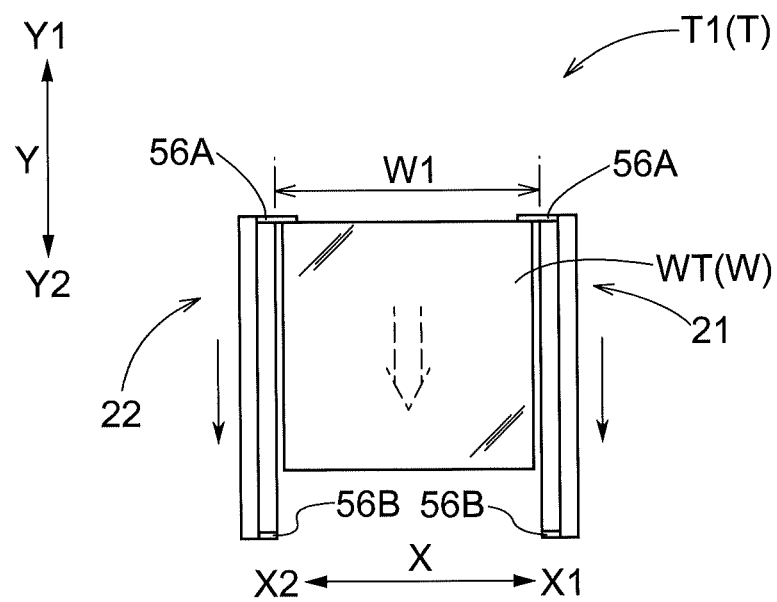
FIG. 18 illustrates operation of a first withdrawal control.

The control apparatus H executes the first protrusion control, an approach control, and a first withdrawal control in the first transfer control. In the first protrusion control, as shown in FIG. 16, the control apparatus H controls the protruding/retracting drive unit 23 so as to cause the first protruding/retracting unit 21 and the second protruding/retracting unit 22 to protrude in the state of the first evacuation spacing W2. When the first protrusion control is executed in this way, the hooks 56 are in an evacuating attitude. In the approach control, as shown in FIG. 17, the control apparatus H controls the second drive unit 25 to change the spacing between the first protruding/retracting unit 21 and the second protruding/retracting unit 22 from the first evacuation spacing W2 to the transfer spacing W1. Also, the control apparatus H controls the hook motor M5 to change the attitude of the hook 56 on the protruding side (the first hook 56A in the example shown in FIG. 17) from the evacuating attitude to the engaging attitude. The first withdrawal control, as shown in FIG. 18, controls the protruding/retracting drive unit 23 so as to cause the first protruding/retracting unit 21 and the second protruding/retracting unit 22 to withdraw in the state of the transfer spacing W1.

Incidentally, in the second transfer control, in a state in which the transfer apparatus 9 is moved at least in the vertical direction Z by the movement apparatus 16 and the transfer apparatus 9 is stopped at a target position corresponding to the transfer target location, the first protruding/retracting unit 21 and the second protruding/retracting unit 22 are caused to protrude/retract in the second direction Y (the transfer direction) to transfer the article W. With such a configuration, a support member such as the support columns 7 that support the raising/lowering body 8 (a support body) may swing in the first direction X (the width direction) due to operation or the like of the movement apparatus 16 including the raising/lowering mechanism 15. In particular, when the raising/lowering body 8 is in a high position, the swing of the transfer apparatus 9 supported by the raising/lowering body 8 in the first direction X tends to be large. If the article W is transferred while the transfer apparatus 9 has swung in the first direction X in this way, the article W transferred at the transfer target location can easily contact the first protruding/retracting unit 21 when withdrawing the first protruding/retracting unit 21. Therefore, the control apparatus H varies the spacing (the evacuation spacing) between the first protruding/retracting unit 21 and the second protruding/retracting unit 22 when performing the second withdrawal control in the second transfer control according to the height of the raising/lowering body 8.

Figure 13:
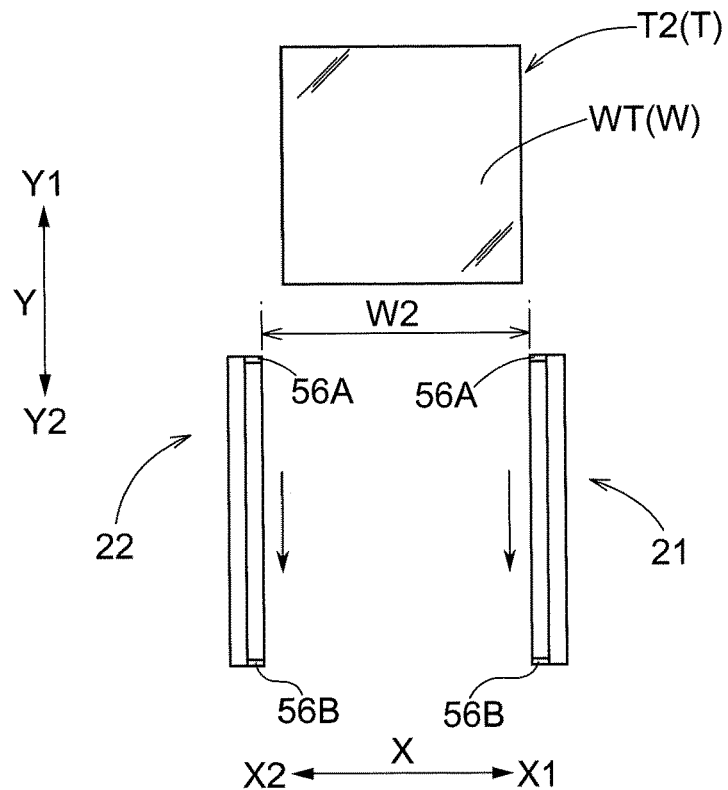
FIG. 13 illustrates operation of a second withdrawal control.

When the raising/lowering body 8 is at a position lower than a set height S, the control apparatus H executes a second protrusion control, a first separation control, and a second withdrawal control in the second transfer control. In the second protrusion control, as shown in FIG. 11, the control apparatus H controls the protruding/retracting drive unit 23 so as to cause the first protruding/retracting unit 21 and the second protruding/retracting unit 22 to protrude in the state of the transfer spacing W1. When the second protrusion control is executed in this way, the hook 56 on the withdrawn side (the second hook 56B in the example shown in FIG. 11) are in the engaging attitude. In the first separation control, as shown in FIG. 12, the control apparatus H controls the second drive unit 25 to change the spacing between the first protruding/retracting unit 21 and the second protruding/retracting unit 22 from the transfer spacing W1 to the first evacuation spacing W2. Also, the control apparatus H controls the hook motor M5 to change the attitude of the hook 56 on the withdrawn side (the second hook 56B in the example shown in FIG. 12) from the engaging attitude to the evacuating attitude. The second withdrawal control, as shown in FIG. 13, controls the protruding/retracting drive unit 23 so as to cause the first protruding/retracting unit 21 and the second protruding/retracting unit 22 to withdraw in the state of the first evacuation spacing W2.

Figure 15:
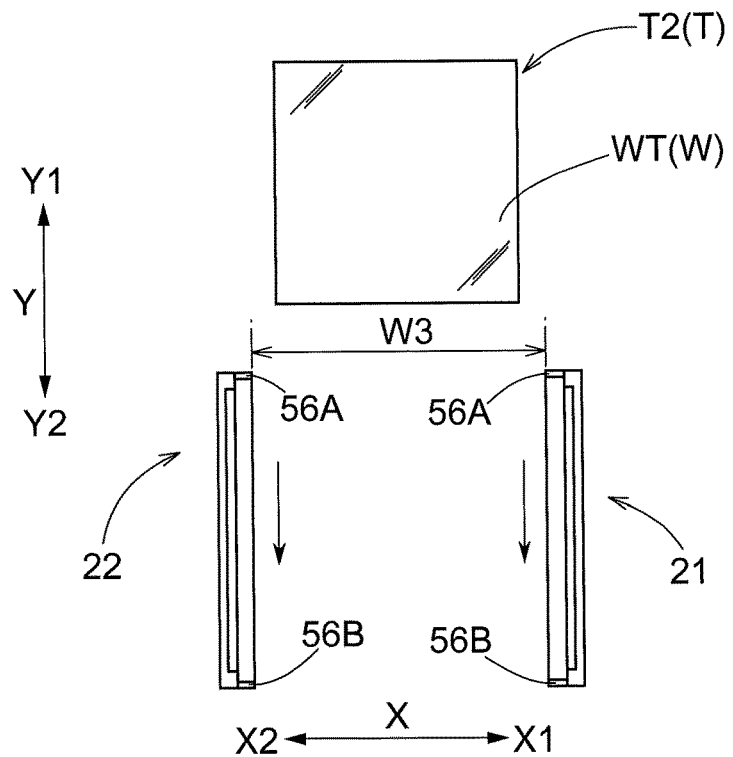
FIG. 15 illustrates operation of a third withdrawal control.

When the raising/lowering body 8 is at a position of at least the set height S, the control apparatus H executes the second protrusion control, a second separation control, and a third withdrawal control in the second transfer control. In the second separation control, as shown in FIG. 14, the control apparatus H controls the first drive unit 24 and the second drive unit 25 to change the spacing between the first protruding/retracting unit 21 and the second protruding/retracting unit 22 from the transfer spacing W1 to the second evacuation spacing W3. Further, in the second separation control, the control apparatus H controls the hook motor M5 to change the attitude of the hook 56 on the withdrawn side (the second hook 56B in the example shown in FIG. 14) from the engaging attitude to the evacuating attitude. In the third withdrawal control, as shown in FIG. 15, the control apparatus H controls the protruding/retracting drive unit 23 so as to cause the first protruding/retracting unit 21 and the second protruding/retracting unit 22 to withdraw in the state of the second evacuation spacing W3.

Thus, when transferring the target article WT from the transfer apparatus 9 to the transfer destination location T2 (when executing the second transfer control), the control apparatus H executes the second protrusion control (corresponding to a protrusion control) that causes the first protruding/retracting unit 21 and the second protruding/retracting unit 22 to protrude in the state of the transfer spacing W1, the separation control that changes the spacing of the first protruding/retracting unit 21 and the second protruding/retracting unit 22 in the first direction X from the transfer spacing W1 to the evacuation spacing (corresponding to the first evacuation spacing W2 or the second evacuation spacing W3), and the withdrawal control (corresponding to the second withdrawal control or the third withdrawal control) that causes the first protruding/retracting unit 21 and the second protruding/retracting unit 22 to withdraw in the state of the evacuation spacing.

When the raising/lowering body 8 is at a position lower than the set height S, as the separation control, the first separation control, which drives only the second drive unit 25 among the first drive unit 24 and the second drive unit 25 to move the second protruding/retracting unit 22 in the first direction X, is executed. When the raising/lowering body 8 is at a position of at least the set height S, as the separation control, the second separation control, which drives both the first drive unit 24 and the second drive unit 25 to move the first protruding/retracting unit 21 and the second protruding/retracting unit 22 in the first direction X, is executed.

Due to execution of the second transfer control in this way, even if the raising/lowering body 8 is at a position of at least the set height S and there is a large swing of the transfer apparatus 9 supported by the raising/lowering body 8 in the first direction X, it is possible to separate both the first protruding/retracting unit 21 and the second protruding/retracting unit 22 from the article W in the first direction X. That is, it becomes easy to avoid a situation in which the article W comes into contact with the first protruding/retracting unit 21 and moves when withdrawing the first protruding/retracting unit 21. When transferring the article W in a state where the raising/lowering body 8 is at a position lower than the set height S, this is accomplished with a small amount of movement of the first protruding/retracting unit 21 in the first direction X, so it becomes easy to shorten the cycle time of operation to transfer the article W.

Figure 8:
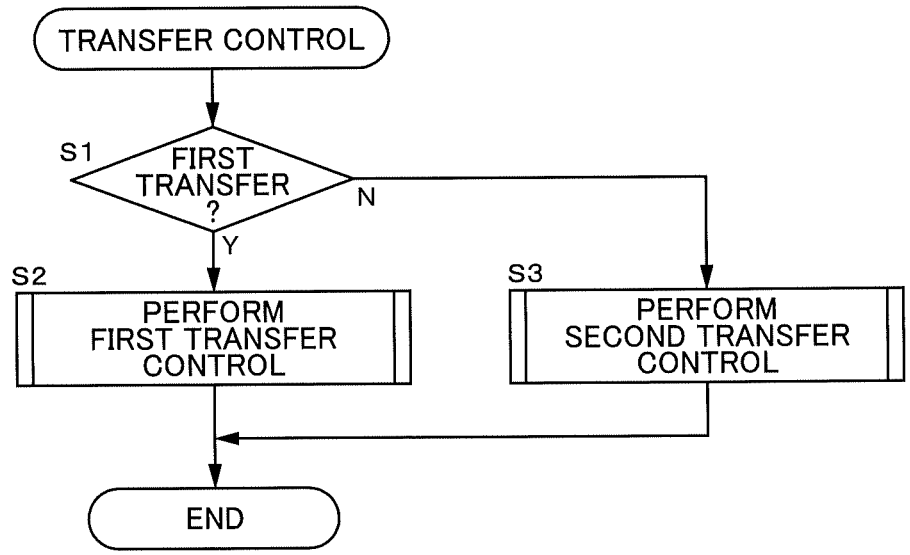
FIG. 8 is a flow chart of transfer control.
Figure 9:
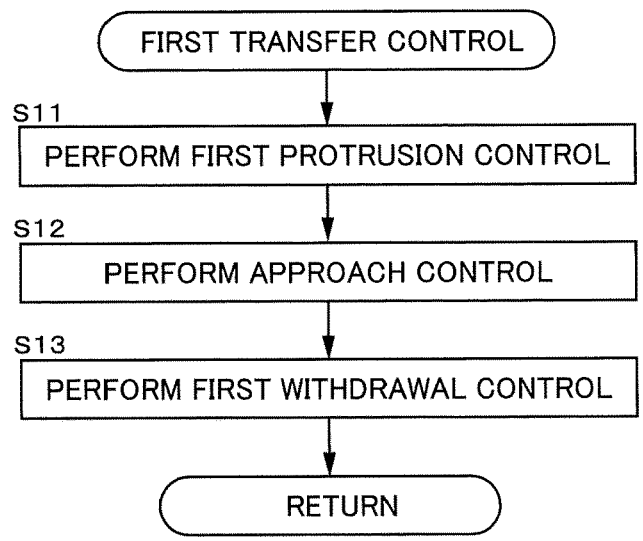
FIG. 9 is a flow chart of a first transfer control.
Figure 10:
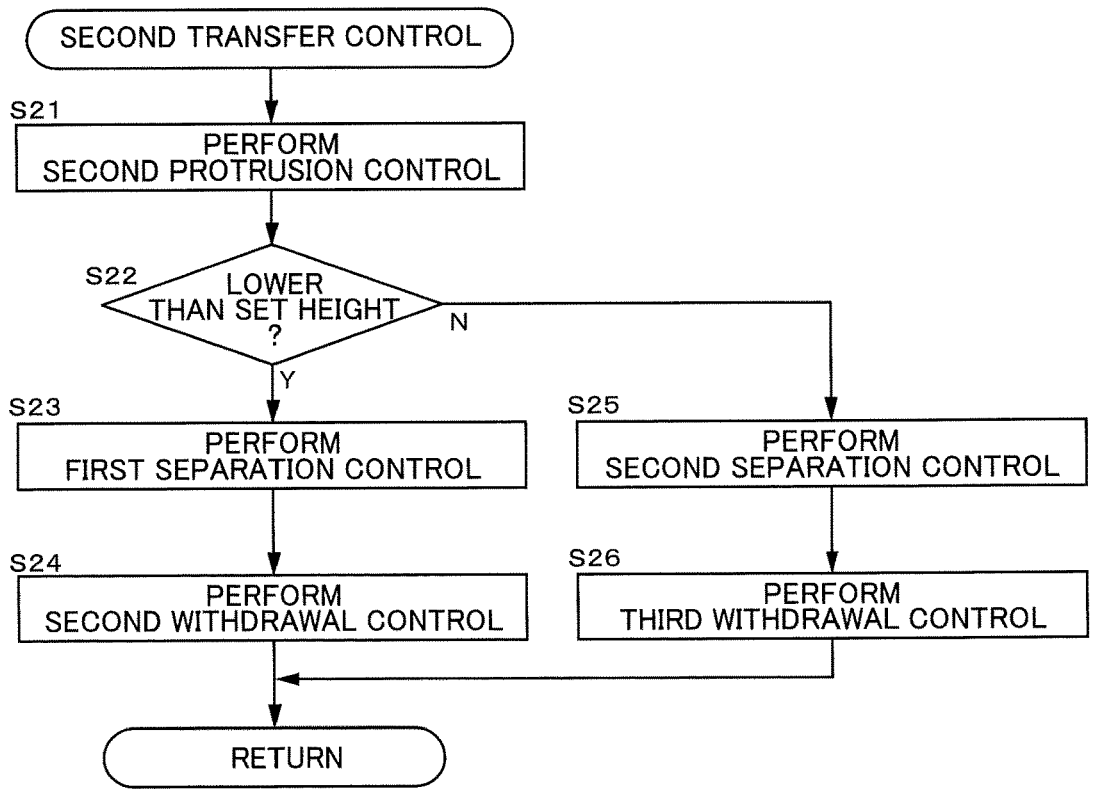
FIG. 10 is a flow chart of a second transfer control.

Next, the transfer control will be described based on the flowcharts shown in FIGS. 8 to 10. When the control apparatus H executes the transfer control, in a case where the first transfer is performed to transfer the target article WT from the transfer apparatus 9 to the transfer destination location T2 (S1: Y), the control apparatus H executes the first transfer control (S2), and in a case where the second transfer is performed to transfer the target article WT from the transfer source location T1 to the transfer apparatus 9 (S1: N), the control apparatus H executes the second transfer control.

Then, when executing the first transfer control, the control apparatus H executes the first protrusion control (S11), the approach control (S12), and the first withdrawal control (S13) in the order described, and the target article WT is transferred from the transfer apparatus 9 to the transfer destination location T2.

Also, when executing the second transfer control, when the raising/lowering body 8 is at a position lower than the set height S (S22: Y), the control apparatus H executes the second protrusion control (S21), the first separation control (S23), and the second withdrawal control (S24) in the order described, thus transferring the target article WT from the transfer source location T1 to the transfer apparatus 9. Also, when executing the second transfer control, when the raising/lowering body 8 is at a position of at least the set height S (S22: N), the control apparatus H executes the second protrusion control (S21), the second separation control (S25), and the third withdrawal control (S26) in the order described, thus transferring the target article WT from the transfer destination location T2 to the transfer apparatus 9.

2. Other Embodiments

Following is a description of other embodiments of the article transport apparatus.

Figure 19:
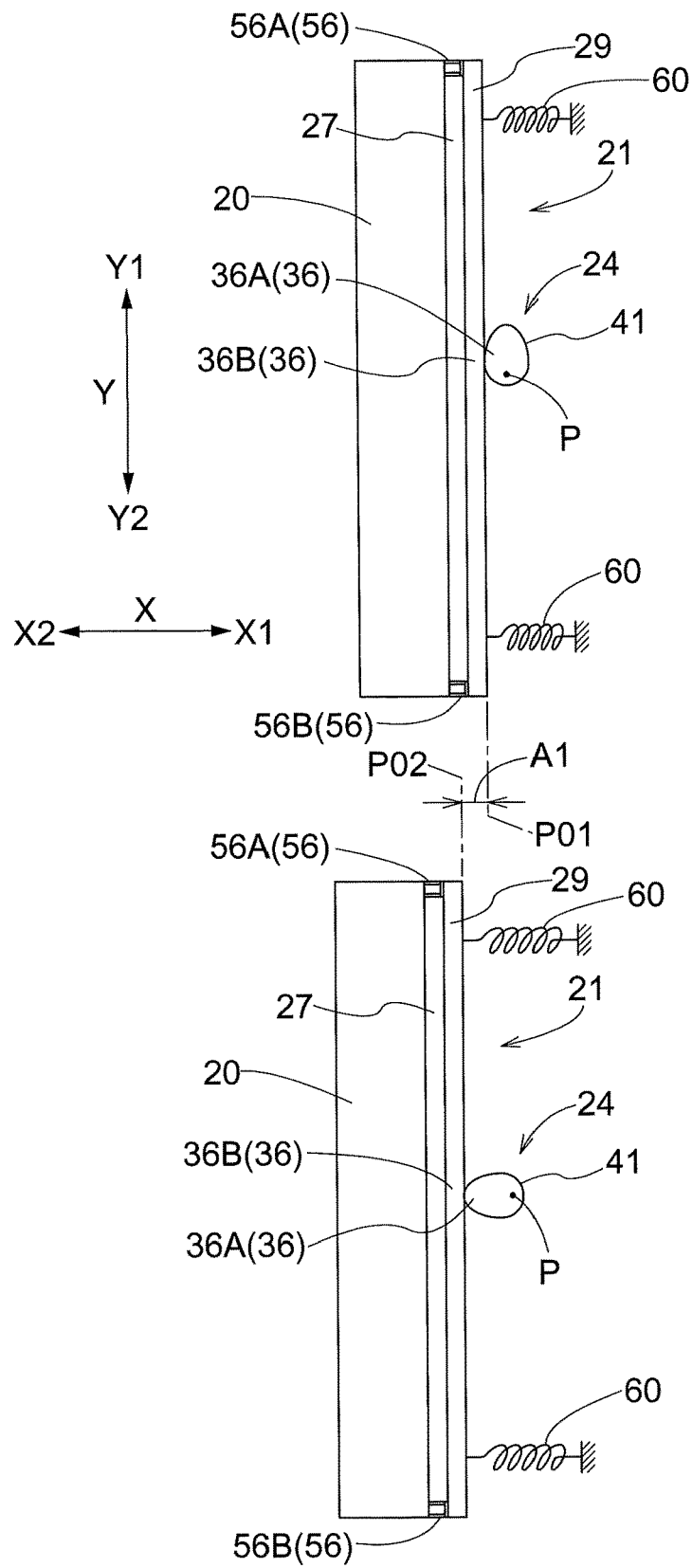
FIG. 19 illustrates operation of the first protruding/retracting unit in the first direction (the width direction) in another embodiment.

(1) In the above embodiment, an exemplary configuration was described in which the first connection unit 36 is provided with the first connection body 42 provided in the swinging body 41, and the guide unit 43 that is provided in the first protruding/retracting unit 21 and slidably guides the first connection body 42. However, the invention is not limited to such a configuration. For example, as shown in FIG. 19, a configuration may be adopted in which a cam member is provided as the swinging body 41, and the first connection unit 36 is provided with a contact receiving portion 36A positioned at a circumferential edge of the swinging body 41, a contact portion 36B that is provided in the first protruding/retracting unit 21 and where the contact receiving portion 36A is contacted from the first direction first side X1, and a biasing member 60 that biases the first protruding/retracting unit 21 on the first direction first side X1. In this case, by the cam member serving as the swinging body 41 swinging around the prescribed axis P, the first protruding/retracting unit 21 moves in the first direction X such that the contact portion 36B is located at a position corresponding to the distance from the prescribed axis P to the circumferential edge of the cam member.

(2) In the above embodiment, an exemplary configuration was described in which the first connection unit 36 and the prescribed axis P are lined up in the first direction X in a state in which the first protruding/retracting unit 21 is located at the second position P02. However, the invention is not limited to such a configuration. For example, a configuration may also be adopted in which the first connection unit 36 and the prescribed axis P are lined up in a direction orthogonal to the first direction X in a state in which the first protruding/retracting unit 21 is located at the second position P02. Note that, in this case, it is suitable that the first drive unit 24 is provided with a brake mechanism for holding the swing of the swinging body 41 at a predetermined position.

Figure 20:
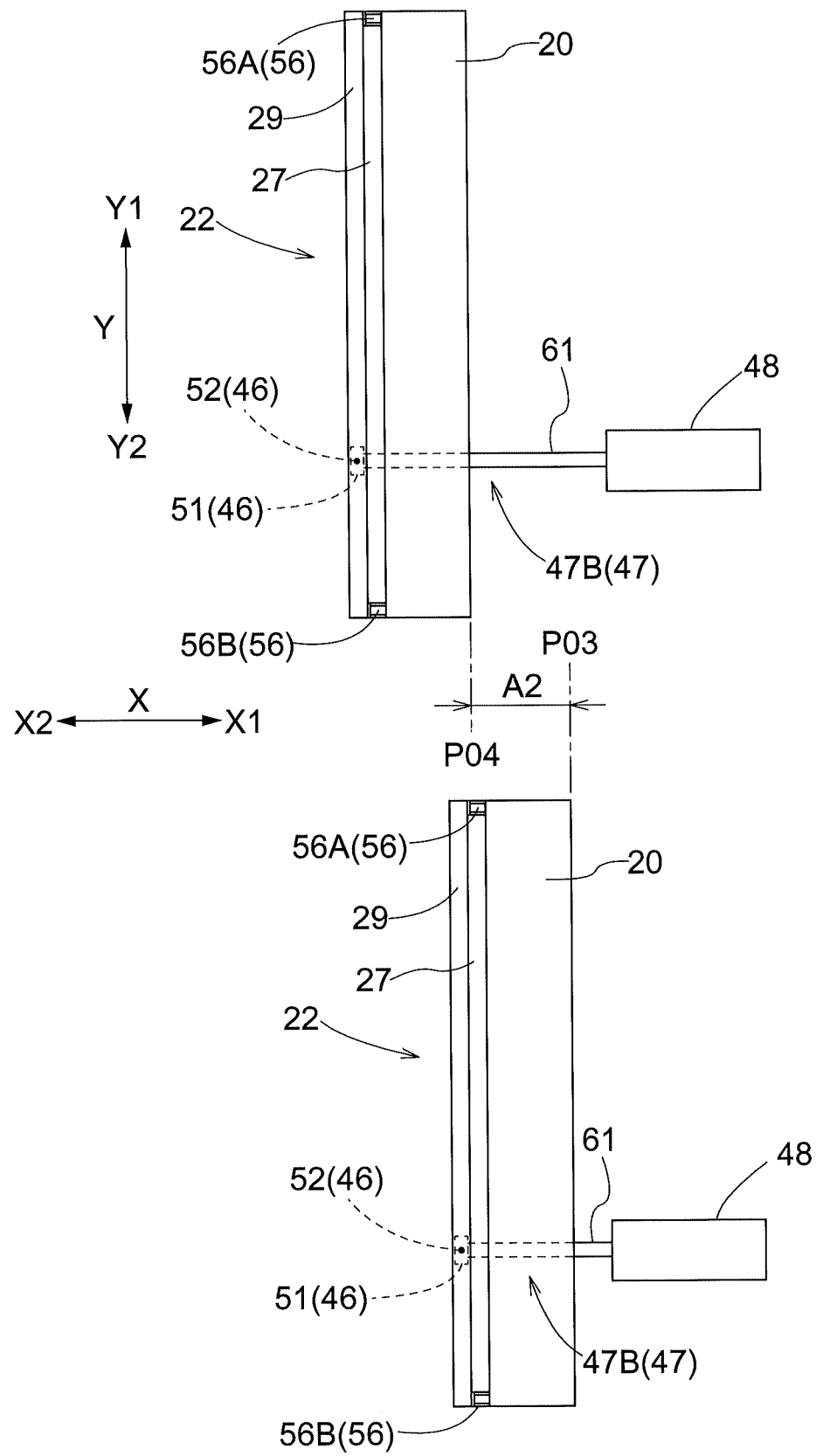
FIG. 20 illustrates operation of the second protruding/retracting unit in the first direction (the width direction) in another embodiment.

(3) In the above embodiment, an exemplary configuration was described in which the first reciprocating movement mechanism 47A having the endless member 53 is adopted as the reciprocating movement mechanism 47. However, the invention is not limited to such a configuration. For example, as shown in FIG. 20, a configuration may also be adopted in which the reciprocating movement mechanism 47 is a second reciprocating movement mechanism 47B provided with an expansion/contraction mechanism 61 driven to expand/contract in the first direction X by the second drive mechanism 48, and in which a second connection body 51 is attached to part of the expansion/contraction mechanism 61. Specifically, for example, a configuration may be adopted in which a main body of a cylinder apparatus that expands/contracts in the first direction X is provided as the second drive mechanism 48, a rod portion of the cylinder apparatus is provided as the expansion/contraction mechanism 61, and the second connection body 51 is attached to a tip portion of the expansion/contraction mechanism 61.

(4) In the above embodiment, an exemplary configuration was described in which when the raising/lowering body 8 is at a position lower than the set height S, the first separation control is executed as the separation control, and when the raising/lowering body 8 is at a position of at least the set height S, the second separation control is executed as the separation control. However, the invention is not limited to such a configuration. For example, a configuration may be adopted in which a sensor that detects swinging of the raising/lowering body 8 in the first direction X is installed, and based on detection information of that sensor, the first separation control is executed as the separation control when swinging of the raising/lowering body 8 is less than a set value, and the second separation control is executed as the separation control when swinging of the raising/lowering body 8 is at least the set value. Also, the second separation control may always be executed as the second separation control.

(5) In the above embodiment, an exemplary configuration was described in which the first protruding/retracting unit 21 is not moved in the first direction X in the first transfer control. However, the invention is not limited to such a configuration. For example, a configuration may be adopted in which the first protruding/retracting unit 21 is moved in the first direction X in the first transfer control.

Figure 21:
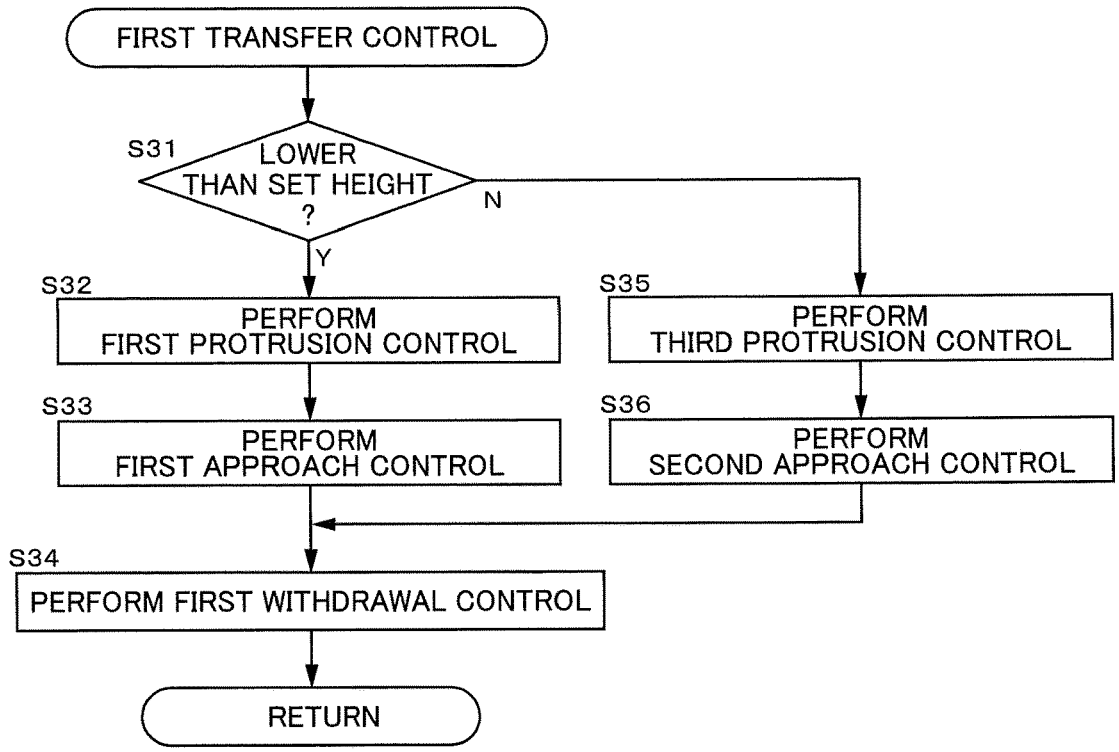
FIG. 21 is a flow chart of the first transfer control in another embodiment.

Specifically, as shown in the flowchart in FIG. 21, when the raising/lowering body 8 is at a position lower than the set height S (S31: Y), in the first transfer control, the control apparatus H executes the first protrusion control (S32), the approach control (first approach control)(S33), and the first withdrawal control (S34). Also, when the raising/lowering body 8 is at a position of at least the set height S (S31: N), in the first transfer control, the control apparatus H executes the third protrusion control (S35), the second approach control (S36), and the first withdrawal control (S34).

Figure 22:
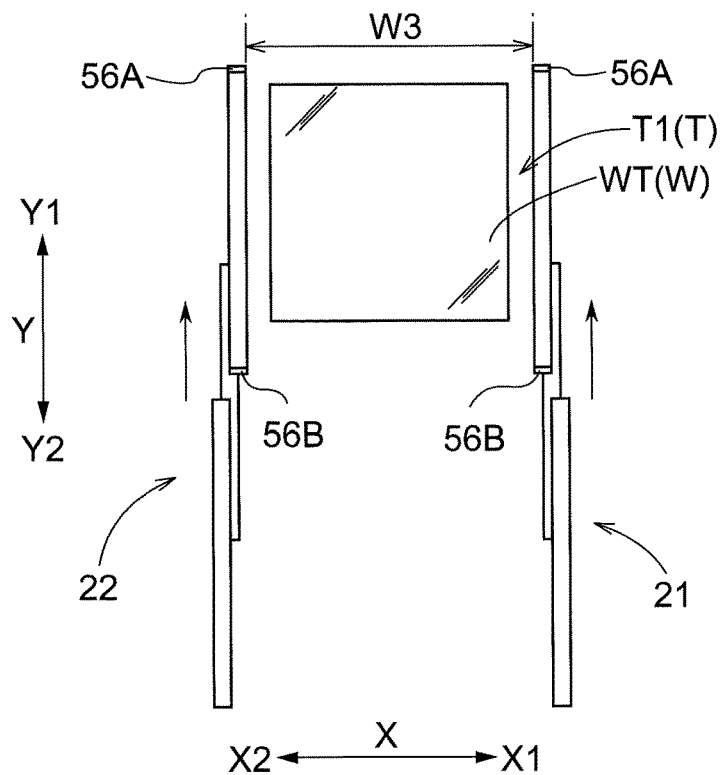
FIG. 22 illustrates operation of a third protrusion control in another embodiment.
Figure 23:
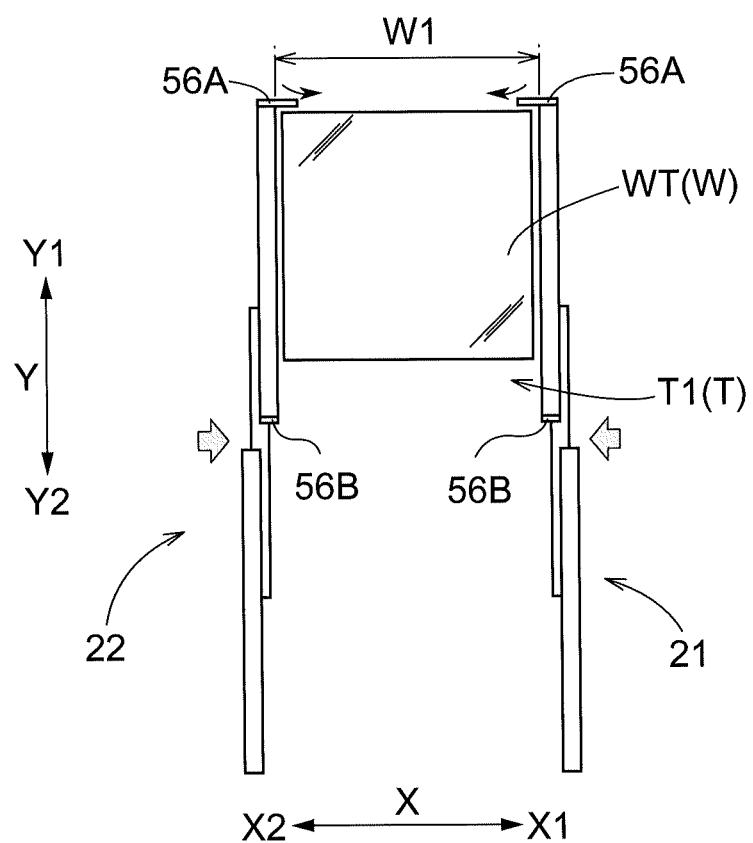
FIG. 23 illustrates operation of a second approach control in another embodiment.

Also, in the third protrusion control, as shown in FIG. 22, the control apparatus H controls the protruding/retracting drive unit 23 to cause the first protruding/retracting unit 21 and the second protruding/retracting unit 22 to protrude in the state of the second evacuation spacing W3. When executing the second protrusion control in this way, the hook 56 is in the evacuating attitude. In the second approach control, as shown in FIG. 23, the control apparatus H controls the first drive unit 24 and the second drive unit 25 to change the spacing between the first protruding/retracting unit 21 and the second protruding/retracting unit 22 from the second evacuation spacing W3 to the transfer spacing W1. Also, in the second approach control, the control apparatus H controls the hook motor M5 to change the attitude of the hook 56 on the protruding side (the first hook 56A in the example shown in FIG. 23) from the evacuating attitude to the engaging attitude.

(6) In the above embodiment, an exemplary configuration was described in which in the transfer apparatus 9, the hooks 56 are provided in the first protruding/retracting unit 21 and the second protruding/retracting unit 22, and the hooks 56 are engaged with the target article WT to move the target article WT in the second direction Y. However, the invention is not limited to such a configuration. For example, a configuration may be adopted in which the target article WT is sandwiched between the first protruding/retracting unit 21 and the second protruding/retracting unit 22, and the first protruding/retracting unit 21 and the second protruding/retracting unit 22 in the state sandwiching the target article WT are moved in the second direction Y.

(7) In the above embodiment, an example was described in which the article transport apparatus 1 is a stacker crane. However, the invention is not limited to such a configuration. For example, a configuration may be adopted in which the article transport apparatus 1 is a truck that is not provided with the raising/lowering body 8, and travels on a path with a prescribed height. Specifically, a configuration may be adopted in which a plurality of shelf boards in a state lined up in the vertical direction Z are installed in an article storage shelf, and a plurality of trucks that travel in the first direction X on a path with a prescribed height corresponding to the shelf boards are installed so as to correspond to each of the plurality of shelf boards lined up in the vertical direction Z, with each of the plurality of trucks serving as the article transport apparatus 1.

(8) It should be noted that the configurations disclosed in each of the above embodiments can be applied in combination with the configurations disclosed in other embodiments as long as no contradiction arises. Regarding those other configurations as well, the embodiments disclosed in the present specification are merely examples in all respects. Accordingly, various modifications can be made as appropriate in a range that does not depart from the gist of the present disclosure.

3. Summary of the Above Embodiments

Following is a summary of the article transport apparatus described above.

An article transport apparatus is provided with a transfer apparatus that moves an article in a transfer direction, and a movement apparatus that moves the transfer apparatus along a transport path, a direction orthogonal to the transfer direction when viewed in a vertical direction being defined as a width direction, the transfer apparatus being provided with a first protruding/retracting unit capable of protruding/retracting in the transfer direction, and a second protruding/retracting unit capable of protruding/retracting in the transfer direction and installed in a state spaced apart from the first protruding/retracting unit in the width direction;

the transfer apparatus further including a first drive unit that moves the first protruding/retracting unit in the width direction, and a second drive unit that moves the second protruding/retracting unit in the width direction; the first drive unit being provided with a first connection unit connected to the first protruding/retracting unit, a swing mechanism that swings the first connection unit around a prescribed axis, and a first drive mechanism that drives the swing mechanism, the first drive unit being configured to move the first protruding/retracting unit in the width direction within a first setting range by swinging the first connection unit; and the second drive unit being provided with a second connection unit connected to the second protruding/retracting unit, a reciprocating movement mechanism that moves the second connection unit in a reciprocating manner along a prescribed path in the width direction, and a second drive mechanism that drives the reciprocating movement mechanism, the second drive unit being configured to move the second protruding/retracting unit in the width direction within a second setting range wider than the first setting range by moving the second connection unit back and forth in the prescribed path.

According to this configuration, the second drive unit that moves the second protruding/retracting unit in the width direction is provided, so by moving the second protruding/retracting unit in the width direction with the second drive unit, it is possible to set the spacing between the first protruding/retracting unit and the second protruding/retracting unit in the width direction to a spacing that corresponds to the size of the article in the width direction. Also, by causing the first protruding/retracting unit and the second protruding/retracting unit to protrude toward the transfer target location in a state in which the first protruding/retracting unit and the second protruding/retracting unit have this sort of spacing, it is possible to transfer the article between the first protruding/retracting unit and the second protruding/retracting unit to the transfer target location. Also, after transferring the article to the transfer target location, after moving the second protruding/retracting unit in the width direction with the second drive unit and moving the first protruding/retracting unit in the width direction with the first drive unit to increase the spacing between the first protruding/retracting unit and the second protruding/retracting unit, by causing the first protruding/retracting unit and the second protruding/retracting unit to withdraw toward the transfer apparatus, it is possible to move both the first protruding/retracting unit and the second protruding/retracting unit away from the article, and therefore it is possible to avoid movement of the article due to the article contacting the first protruding/retracting unit when withdrawing the first protruding/retracting unit.

Also, the first setting range in which the first protruding/retracting unit is moved in the width direction by the first drive unit is smaller than the second setting range in which the second protruding/retracting unit is moved in the width direction by the second drive unit. Therefore, the space that needs to be left open for movement of the first protruding/retracting unit in the width direction on the first protruding/retracting unit side with respect to the article at the transfer target location can be kept to a small space. Further, the second drive unit has a configuration in which the second protruding/retracting unit is moved by moving the second connection unit back and forth along a prescribed path, whereas the first drive unit has a configuration in which the first protruding/retracting unit is moved by swinging the first connection unit around a prescribed axis, so the configuration of the first drive unit can easily be made compact. Therefore, according to this configuration, while it is possible to avoid movement of the article when withdrawing the first protruding/retracting unit, it is also possible to adopt a compact configuration for the first drive unit, and possible to suppress a decrease in accommodation efficiency of the article at the transfer target location.

Here, it is suitable to adopt a configuration in which the swing mechanism is provided with a swinging body supported so as to be capable of swinging around the prescribed axis, and the first connection unit is provided with a first connection body provided at a position away from the prescribed axis in the swinging body, and a guide unit that is provided in the first protruding/retracting unit and slidably guides the first connection body in a direction that intersects the width direction.

According to this configuration, when the swinging body is swung around the prescribed axis to swing the first connection body around the prescribed axis, while guiding the first connection body in a direction that intersects the width direction with the guide unit, it is possible to move the guide unit in the width direction with the first connection body to move the first protruding/retracting unit in the width direction. Thus, it is possible to simplify the configuration that moves the first protruding/retracting unit in the width direction along with swinging of the swinging body.

Also, it is suitable to adopt a configuration in which a direction in which the first protruding/retracting unit exists with respect to the second protruding/retracting unit in the width direction is defined as a width direction first side, and the opposite side thereto is defined as a width direction second side, and the first drive unit is configured such that, in a state in which the first protruding/retracting unit is positioned at an end on the width direction second side in the first setting range, the first connection unit and the prescribed axis are lined up in the width direction.

According to this configuration, in a state in which the first protruding/retracting unit is positioned at the end on the width direction second side in the first setting range, the first connection unit and the prescribed axis are lined up in the width direction. Therefore, in such a state, even if a load acts on the first protruding/retracting unit from the width direction second side, it is difficult for the swinging body to swing around the prescribed axis. Therefore, it is easy to hold the position of the first protruding/retracting unit in the width direction during an operation to transfer the article.

Also, it is suitable to adopt a configuration in which the second connection unit is provided with a second connection body and a connection fulcrum provided in the second protruding/retracting unit and to which the second connection body is connected, the reciprocating movement mechanism is a first reciprocating movement mechanism or a second reciprocating movement mechanism, the first reciprocating movement mechanism is provided with an endless member installed in the width direction and rotationally driven by the second drive mechanism, the second connection body being attached to part of the endless member, and the second reciprocating movement mechanism is provided with an expansion/contraction mechanism driven by the second drive mechanism to expand/contract in the width direction, the second connection body being attached to part of the expansion/contraction mechanism.

According to this configuration, when the first reciprocating movement mechanism is adopted as the reciprocating movement mechanism, it is possible to move the second connection unit in a reciprocating manner along the prescribed path in the width direction by rotationally driving the endless member with the second drive mechanism. Also, when the second reciprocating movement mechanism is adopted as the reciprocating movement mechanism, it is possible to move the second connection unit in a reciprocating manner along the prescribed path in the width direction by driving the expansion/contraction mechanism to expand/contract with the second drive mechanism. By moving the second connection unit in the width direction by rotation of the endless member or expansion/contraction of the expansion/contraction mechanism in this way, it is easy to adopt a configuration that moves the second protruding/retracting unit throughout the comparatively wide second setting range.

Also, it is suitable to adopt a configuration in which a control apparatus that controls the transfer apparatus is further provided, in which the movement apparatus is provided with a support body that supports the transfer apparatus and a raising/lowering mechanism that moves the support body in the vertical direction, regarding the spacing between the first protruding/retracting unit and the second protruding/retracting unit in the width direction, a spacing corresponding to the spacing in the width direction of a target article that is an article to be transferred is defined as a transfer spacing, and a spacing wider than the transfer spacing is defined as an evacuation spacing, the control apparatus, when transferring the target article from the transfer apparatus to a transfer destination location, executes a protrusion control that causes the first protruding/retracting unit and the second protruding/retracting unit to protrude in the state of the transfer spacing, a separation control that changes the spacing between the first protruding/retracting unit and the second protruding/retracting unit in the width direction from the transfer spacing to the evacuation spacing, and a withdrawal control that causes the first protruding/retracting unit and the second protruding/retracting unit to withdraw in the state of the evacuation spacing, when the support body is at a position lower than a set height, as the separation control, executes a first separation control that drives only the second drive unit among the first drive unit and the second drive unit to move the second protruding/retracting unit in the width direction, and when the support body is at a position of at least the set height, as the separation control, executes a second separation control that drives both the first drive unit and the second drive unit to move the first protruding/retracting unit and the second protruding/retracting unit in the width direction.

According to this configuration, in a state in which the transfer apparatus is moved in at least the vertical direction by the movement apparatus and the transfer apparatus is stopped at a target position corresponding to the transfer target location, the article is transferred by causing the first protruding/retracting unit and the second protruding/retracting unit to protrude/retract in the transfer direction. In such a configuration, a support member such as a mast that supports the support body may swing in the width direction due to operation or the like of the movement apparatus including the raising/lowering mechanism. In particular, when the support body is in a high position, the swing of the transfer apparatus supported by the support body in the width direction tends to be large. If the article is transferred while the transfer apparatus has swung in the width direction in this way, the target article transferred at the transfer target location can easily contact the first protruding/retracting unit when withdrawing the first protruding/retracting unit. However, according to the present configuration, when transferring the article in a state in which the support body is located at a position of at least the set height, the second separation control is executed as the separation control. Thus, it is possible to separate both the first protruding/retracting unit and the second protruding/retracting unit from the article in the width direction, so it is easy to avoid a situation in which the article contacts the first protruding/retracting unit and moves when withdrawing the first protruding/retracting unit. On the other hand, when transferring the article in a state in which the support body is located at a position lower than the set height, the first separation control is executed as the separation control. In this case, it is not necessary to move the first protruding/retracting unit in the width direction, so it becomes easy to shorten the cycle time of operation to transfer the article.

What is claimed is:

1. An article transport apparatus comprising a transfer apparatus that moves an article in a transfer direction, and a movement apparatus that moves the transfer apparatus along a transport path, wherein:
   a direction orthogonal to the transfer direction when viewed in a vertical direction is defined as a width direction,
   the transfer apparatus is provided with a first protruding/retracting unit capable of protruding/retracting in the transfer direction, and a second protruding/retracting unit capable of protruding/retracting in the transfer direction and installed in a state spaced apart from the first protruding/retracting unit in the direction,
   the transfer apparatus further comprises a first drive unit that moves the first protruding/retracting unit in the width direction, and a second drive unit that moves the second protruding/retracting unit in the width direction,
   the first drive unit is provided with a first connection unit connected to the first protruding/retracting unit, a swing mechanism that swings the first connection unit around a prescribed axis, and a first drive mechanism that drives the swing mechanism, the first drive unit configured to move the first protruding/retracting unit in the width direction within a first setting range by swinging the first connection unit,
   the second drive unit is provided with a second connection unit connected to the second protruding/retracting unit, a reciprocating movement mechanism that moves the second connection unit in a reciprocating manner along a prescribed path in the width direction, and a second drive mechanism that drives the reciprocating movement mechanism, the second drive unit configured to move the second protruding/retracting unit in the width direction within a second setting range wider than the first setting range by moving the second connection unit back and forth in the prescribed path,
   the swing mechanism is provided with a swinging body supported so as to be capable of swinging around the prescribed axis, and
   the first connection unit is provided with a first connection body provided at a position away from the prescribed axis in the swinging body, and a guide unit that is provided in the first protruding/retracting unit and slidably guides the first connection body in a direction that intersects the width direction.

2. The article transport apparatus according to claim 1, wherein a direction in which the first protruding/retracting unit exists with respect to the second protruding/retracting unit in the width direction is defined as a width direction first side, and an opposite side thereto is defined as a width direction second side, and
wherein the first drive unit is configured such that, in a state in which the first protruding/retracting unit is positioned at an end on the width direction second side in the first setting range, the first connection unit and the prescribed axis are lined up in the width direction.

3. The article transport apparatus according to claim 1, wherein:
the second connection unit is provided with a second connection body and a connection fulcrum provided in the second protruding/retracting unit and to which the second connection body is connected,
the reciprocating movement mechanism is a first reciprocating movement mechanism or a second reciprocating movement mechanism,
the first reciprocating movement mechanism is provided with an endless member installed in the width direction and rotationally driven by the second drive mechanism, the second connection body attached to part of the endless member, and
the second reciprocating movement mechanism is provided with an expansion/contraction mechanism driven by the second drive mechanism to expand/contract in the width direction, the second connection body attached to part of the expansion/contraction mechanism.

4. The article transport apparatus according to claim 2, wherein:
the second connection unit is provided with a second connection body and a connection fulcrum provided in the second protruding/retracting unit and to which the second connection body is connected,
the reciprocating movement mechanism is a first reciprocating movement mechanism or a second reciprocating movement mechanism,
the first reciprocating movement mechanism is provided with an endless member installed in the width direction and rotationally driven by the second drive mechanism, the second connection body attached to part of the endless member, and
the second reciprocating movement mechanism is provided with an expansion/contraction mechanism driven by the second drive mechanism to expand/contract in the width direction, the second connection body attached to part of the expansion/contraction mechanism.

5. The article transport apparatus according to claim 1, further comprising:
a control apparatus that controls the transfer apparatus,
wherein the movement apparatus is provided with a support body that supports the transfer apparatus and a raising/lowering mechanism that moves the support body in the vertical direction,
wherein, regarding spacing between the first protruding/retracting unit and the second protruding/retracting unit in the width direction, a transfer spacing corresponds to the spacing in the width direction of a target article that is to be transferred, and the spacing wider than the transfer spacing is defined as an evacuation spacing,
wherein the control apparatus, when transferring the target article from the transfer apparatus to a transfer destination location, executes a protrusion control that causes the first protruding/retracting unit and the second protruding/retracting unit to protrude in the state of the transfer spacing, a separation control that changes the spacing between the first protruding/retracting unit and the second protruding/retracting unit in the width direction from the transfer spacing to the evacuation spacing, and a withdrawal control that causes the first protruding/retracting unit and the second protruding/retracting unit to withdraw in the state of the evacuation spacing,
wherein, when the support body is at a position lower than a set height as the separation control, the control apparatus executes a first separation control that drives the second drive unit and does not drive the first drive unit to move the second protruding/retracting unit in the width direction, and
wherein, when the support body is at a position of at least the set height as the separation control, the control apparatus executes a second separation control that drives both the first drive unit and the second drive unit to move the first protruding/retracting unit and the second protruding/retracting unit in the width direction.

6. The article transport apparatus according to claim 1, further comprising:
a control apparatus that controls the transfer apparatus,
wherein the movement apparatus is provided with a support body that supports the transfer apparatus and a raising/lowering mechanism that moves the support body in the vertical direction,
wherein, regarding spacing between the first protruding/retracting unit and the second protruding/retracting unit in the width direction, a transfer spacing corresponds to the spacing in the width direction of a target article that is to be transferred, and the spacing wider than the transfer spacing is defined as an evacuation spacing,
wherein the control apparatus, when transferring the target article from the transfer apparatus to a transfer destination location, executes a protrusion control that causes the first protruding/retracting unit and the second protruding/retracting unit to protrude in the state of the transfer spacing, a separation control that changes the spacing between the first protruding/retracting unit and the second protruding/retracting unit in the width direction from the transfer spacing to the evacuation spacing, and a withdrawal control that causes the first protruding/retracting unit and the second protruding/retracting unit to withdraw in the state of the evacuation spacing,
wherein, when the support body is at a position lower than a set height as the separation control, the control apparatus executes a first separation control that drives the second drive unit and does not drive the first drive unit to move the second protruding/retracting unit in the width direction, and
wherein, when the support body is at a position of at least the set height as the separation control, the control apparatus executes a second separation control that drives both the first drive unit and the second drive unit to move the first protruding/retracting unit and the second protruding/retracting unit in the width direction.

7. The article transport apparatus according to claim 2, further comprising:
a control apparatus that controls the transfer apparatus, wherein the movement apparatus is provided with a support body that supports the transfer apparatus and a raising/lowering mechanism that moves the support body in the vertical direction, wherein, regarding spacing between the first protruding/retracting unit and the second protruding/retracting unit in the width direction, a transfer spacing corresponds to the spacing in the width direction of a target article that is to be transferred, and the spacing wider than the transfer spacing is defined as an evacuation spacing, wherein the control apparatus, when transferring the target article from the transfer apparatus to a transfer destination location, executes a protrusion control that causes the first protruding/retracting unit and the second protruding/retracting unit to protrude in the state of the transfer spacing, a separation control that changes the spacing between the first protruding/retracting unit and the second protruding/retracting unit in the width direction from the transfer spacing to the evacuation spacing, and a withdrawal control that causes the first protruding/retracting unit and the second protruding/retracting unit to withdraw in the state of the evacuation spacing, wherein, when the support body is at a position lower than a set height as the separation control, the control apparatus executes a first separation control that drives the second drive unit and does not drive the first drive unit to move the second protruding/retracting unit in the width direction, and wherein when the support body is at a position of at least the set height as the separation control, the control apparatus executes a second separation control that drives both the first drive unit and the second drive unit to move the first protruding/retracting unit and the second protruding/retracting unit in the width direction.

8. The article transport apparatus according to claim 3, further comprising:

a control apparatus that controls the transfer apparatus, wherein the movement apparatus is provided with a support body that supports the transfer apparatus and a raising/lowering mechanism that moves the support body in the vertical direction, wherein, regarding spacing between the first protruding/retracting unit and the second protruding/retracting unit in the width direction, a transfer spacing corresponds to the spacing in the width direction of a target article that is to be transferred, and the spacing wider than the transfer spacing is defined as an evacuation spacing, wherein the control apparatus, when transferring the target article from the transfer apparatus to a transfer destination location, executes a protrusion control that causes the first protruding/retracting unit and the second protruding/retracting unit to protrude in the state of the transfer spacing, a separation control that changes the spacing between the first protruding/retracting unit and the second protruding/retracting unit in the width direction from the transfer spacing to the evacuation spacing, and a withdrawal control that causes the first protruding/retracting unit and the second protruding/retracting unit to withdraw in the state of the evacuation spacing, wherein, when the support body is at a position lower than a set height as the separation control, the control apparatus executes a first separation control that drives the second drive unit and does not drive the first drive unit to move the second protruding/retracting unit in the width direction, and wherein, when the support body is at a position of at least the set height as the separation control, the control apparatus executes a second separation control that drives both the first drive unit and the second drive unit to move the first protruding/retracting unit and the second protruding/retracting unit in the width direction.

9. The article transport apparatus according to claim 4, further comprising:

a control apparatus that controls the transfer apparatus, wherein the movement apparatus is provided with a support body that supports the transfer apparatus and a raising/lowering mechanism that moves the support body in the vertical direction, wherein, regarding spacing between the first protruding/retracting unit and the second protruding/retracting unit in the width direction, a transfer spacing corresponds to the spacing in the width direction of a target article that is to be transferred, and the spacing wider than the transfer spacing is defined as an evacuation spacing, wherein the control apparatus, when transferring the target article from the transfer apparatus to a transfer destination location, executes a protrusion control that causes the first protruding/retracting unit and the second protruding/retracting unit to protrude in the state of the transfer spacing, a separation control that changes the spacing between the first protruding/retracting unit and the second protruding/retracting unit in the width direction from the transfer spacing to the evacuation spacing, and a withdrawal control that causes the first protruding/retracting unit and the second protruding/retracting unit to withdraw in the state of the evacuation spacing, wherein, when the support body is at a position lower than a set height as the separation control, the control apparatus executes a first separation control that drives the second drive unit and does not drive the first drive unit to move the second protruding/retracting unit in the width direction, and wherein, when the support body is at a position of at least the set height as the separation control, the control apparatus executes a second separation control that drives both the first drive unit and the second drive unit to move the first protruding/retracting unit and the second protruding/retracting unit in the width direction.

10. An article transport apparatus comprising a transfer apparatus that moves an article in a transfer direction, and a movement apparatus that moves the transfer apparatus along a transport path, wherein:

a direction orthogonal to the transfer direction when viewed in a vertical direction is defined as a width direction, the transfer apparatus is provided with a first protruding/retracting unit capable of protruding/retracting in the transfer direction, and a second protruding/retracting unit capable of protruding/retracting in the transfer direction and installed in a state spaced apart from the first protruding/retracting unit in the width direction, the transfer apparatus further comprises a first drive unit that moves the first protruding/retracting unit in the width direction, and a second drive unit that moves the second protruding/retracting unit in the width direction, the first drive unit is provided with a first connection unit connected to the first protruding/retracting unit, a swing mechanism that swings the first connection unit around a prescribed axis, and a first drive mechanism that drives the swing mechanism, the first drive unit configured to move the first protruding/retracting unit in the width direction within a first setting range by swinging the first connection unit, and the second drive unit is provided with a second connection unit connected to the second protruding/retracting unit, a reciprocating movement mechanism that moves the second connection unit in a reciprocating manner along a prescribed path in the width direction, and a second drive mechanism that drives the reciprocating movement mechanism, the second drive unit configured to move the second protruding/retracting unit in the width direction within a second setting range wider than the first setting range by moving the second connection unit back and forth in the prescribed path, a direction in which the first protruding/retracting unit exists with respect to the second protruding/retracting unit in the width direction is defined as a width direction first side, and an opposite side thereto is defined as a width direction second side, and the first drive unit is configured such that, in a state in which the first protruding/retracting unit is positioned at an end on the width direction second side in the first setting range, the first connection unit and the prescribed axis are lined up in the width direction.

11. The article transport apparatus according to claim 10, wherein:

the second connection unit is provided with a second connection body and a connection fulcrum provided in the second protruding/retracting unit and to which the second connection body is connected, the reciprocating movement mechanism is a first reciprocating movement mechanism or a second reciprocating movement mechanism, the first reciprocating movement mechanism is provided with an endless member installed in the width direction and rotationally driven by the second drive mechanism, the second connection body attached to part of the endless member, and the second reciprocating movement mechanism is provided with an expansion/contraction mechanism driven by the second drive mechanism to expand/contract in the width direction, the second connection body attached to part of the expansion/contraction mechanism.

12. The article transport apparatus according to claim 10, further comprising:

a control apparatus that controls the transfer apparatus, wherein the movement apparatus is provided with a support body that supports the transfer apparatus and a raising/lowering mechanism that moves the support body in the vertical direction, wherein, regarding spacing between the first protruding/retracting unit and the second protruding/retracting unit in the width direction, a transfer spacing corresponds to the spacing in the width direction of a target article that is to be transferred, and the spacing wider than the transfer spacing is defined as an evacuation spacing, wherein the control apparatus, when transferring the target article from the transfer apparatus to a transfer destination location, executes a protrusion control that causes the first protruding/retracting unit and the second protruding/retracting unit to protrude in the state of the transfer spacing, a separation control that changes the spacing between the first protruding/retracting unit and the second protruding/retracting unit in the width direction from the transfer spacing to the evacuation spacing, and a withdrawal control that causes the first protruding/retracting unit and the second protruding/retracting unit to withdraw in the state of the evacuation spacing, wherein, when the support body is at a position lower than a set height as the separation control, the control apparatus executes a first separation control that drives the second drive unit and does not drive the first drive unit to move the second protruding/retracting unit in the width direction, and wherein, when the support body is at a position of at least the set height as the separation control, the control apparatus executes a second separation control that drives both the first drive unit and the second drive unit to move the first protruding/retracting unit and the second protruding/retracting unit in the width direction.

13. The article transport apparatus according to claim 11, further comprising:

a control apparatus that controls the transfer apparatus, wherein the movement apparatus is provided with a support body that supports the transfer apparatus and a raising/lowering mechanism that moves the support body in the vertical direction, wherein regarding spacing between the first protruding/retracting unit and the second protruding/retracting unit in the width direction, a transfer spacing corresponds to the spacing in the width direction of a target article that is to be transferred, and the spacing wider than the transfer spacing is defined as an evacuation spacing, wherein the control apparatus, when transferring the target article from the transfer apparatus to a transfer destination location, executes a protrusion control that causes the first protruding/retracting unit and the second protruding/retracting unit to protrude in the state of the transfer spacing, a separation control that changes the spacing between the first protruding/retracting unit and the second protruding/retracting unit in the width direction from the transfer spacing to the evacuation spacing, and a withdrawal control that causes the first protruding/retracting unit and the second protruding/retracting unit to withdraw in the state of the evacuation spacing, wherein, when the support body is at a position lower than a set height as the separation control, the control apparatus executes a first separation control that drives the second drive unit and does not drive the first drive unit to move the second protruding/retracting unit in the width direction, and wherein, when the support body is at a position of at least the set height as the separation control, the control apparatus executes a second separation control that drives both the first drive unit and the second drive unit to move the first protruding/retracting unit and the second protruding/retracting unit in the width direction.

14. An article transport apparatus comprising a transfer apparatus that moves an article in a transfer direction, and a movement apparatus that moves the transfer apparatus along a transport path, wherein:

a direction orthogonal to the transfer direction when viewed in a vertical direction is defined as a width direction, the transfer apparatus is provided with a first protruding/retracting unit capable of protruding/retracting in the transfer direction, and a second protruding/retracting unit capable of protruding/retracting in the transfer direction and installed in a state spaced apart from the first protruding/retracting unit in the width direction, the transfer apparatus further comprises a first drive unit that moves the first protruding/retracting unit in the width direction, and a second drive unit that moves the second protruding/retracting unit in the width direction, the first drive unit is provided with a first connection unit connected to the first protruding/retracting unit, a swing mechanism that swings the first connection unit around a prescribed axis, and a first drive mechanism that drives the swing mechanism, the first drive unit configured to move the first protruding/retracting unit in the width direction within a first setting range by swinging the first connection unit, the second drive unit is provided with a second connection unit connected to the second protruding/retracting unit, a reciprocating movement mechanism that moves the second connection unit in a reciprocating manner along a prescribed path in the width direction, and a second drive mechanism that drives the reciprocating movement mechanism, the second drive unit configured to move the second protruding/retracting unit in the width direction within a second setting range wider than the first setting range by moving the second connection unit back and forth in the prescribed path, the second connection unit is provided with a second connection body and a connection fulcrum provided in the second protruding/retracting unit and to which the second connection body is connected, the reciprocating movement mechanism is a first reciprocating movement mechanism or a second reciprocating movement mechanism, the first reciprocating movement mechanism is provided with an endless member installed in the width direction and rotationally driven by the second drive mechanism, the second connection body attached to part of the endless member, and the second reciprocating movement mechanism is provided with an expansion/contraction mechanism driven by the second drive mechanism to expand/contract in the width direction, the second connection body attached to part of the expansion/contraction mechanism.

15. The article transport apparatus according to claim 14, further comprising:

a control apparatus that controls the transfer apparatus, wherein the movement apparatus is provided with a support body that supports the transfer apparatus and a raising/lowering mechanism that moves the support body in the vertical direction, wherein regarding pacing between the first protruding/retracting unit and the second protruding/retracting unit in the width direction, a transfer spacing corresponds to the spacing in the width direction of a target article that is to be transferred, and the spacing wider than the transfer spacing is defined as an evacuation spacing, wherein the control apparatus, when transferring the target article from the transfer apparatus to a transfer destination location, executes a protrusion control that causes the first protruding/retracting unit and the second protruding/retracting unit to protrude in the state of the transfer spacing, a separation control that changes the spacing between the first protruding/retracting unit and the second protruding/retracting unit in the width direction from the transfer spacing to the evacuation spacing, and a withdrawal control that causes the first protruding/retracting unit and the second protruding/retracting unit to withdraw in the state of the evacuation spacing, wherein, when the support body is at a position lower than a set height as the separation control, the control apparatus executes a first separation control that drives the second drive unit and does not drive the first drive unit to move the second protruding/retracting unit in the width direction, and wherein, when the support body is at a position of at least the set height as the separation control, the control apparatus executes a second separation control that drives both the first drive unit and the second drive unit to move the first protruding/retracting unit and the second protruding/retracting unit in the width direction.

* * * * *

UNITED STATES PATENT AND TRADEMARK OFFICE
CERTIFICATE OF CORRECTION

PATENT NO. : 11,873,165 B2
APPLICATION NO. : 17/160935
DATED : January 16, 2024
INVENTOR(S) : Kunihiro Tsukamoto It is certified that error appears in the above-identified patent and that said Letters Patent is hereby corrected as shown below:

In the Claims

Column 18, Line 37, Claim 1, after "the" insert -- width --

Signed and Sealed this
Twelfth Day of March, 2024

Katherine Kelly Vidal
*Director of the United States Patent and Trademark Office*